(12) United States Patent
Shimizu et al.

(10) Patent No.: US 6,895,289 B2
(45) Date of Patent: May 17, 2005

(54) DOCUMENT MANAGEMENT SYSTEM AND METHOD

(75) Inventors: Katsuhito Shimizu, Hitachi (JP); Tooru Kimura, Hitachi (JP); Yoshio Maruyama, Mito (JP); Yukiko Mouri, Hitachi (JP); Satoru Shimizu, Hitachi (JP); Hidekazu Fujimura, Mito (JP); Masao Furukawa, Taga-gun (JP); Yoshiharu Hayashi, Hitachinaka (JP); Yasushi Hayasaka, Mito (JP)

(73) Assignee: Hitachi, Ltd. (JP)

( * ) Notice: Subject to any disclaimer, the term of this patent is extended or adjusted under 35 U.S.C. 154(b) by 156 days.

(21) Appl. No.: 10/291,778

(22) Filed: Nov. 12, 2002

(65) Prior Publication Data

US 2003/0105740 A1 Jun. 5, 2003

(30) Foreign Application Priority Data

Nov. 16, 2001 (JP) .................................. 2001-351963
Nov. 16, 2001 (JP) .................................. 2001-351974

(51) Int. Cl.$^7$ .......................................... G05B 19/42
(52) U.S. Cl. ................. 700/87; 700/2; 700/5; 700/17; 700/83; 707/200; 707/203; 707/205; 709/224; 709/226; 715/511; 715/514; 715/530

(58) Field of Search ............... 700/2, 5, 17, 83, 700/87; 709/224, 226; 707/200, 203, 205; 715/530, 511, 514

(56) References Cited

U.S. PATENT DOCUMENTS

| 5,845,303 | A | * | 12/1998 | Templeman | ............... 715/517 |
| 6,195,677 | B1 | * | 2/2001 | Utsumi | ...................... 709/201 |
| 6,263,255 | B1 | * | 7/2001 | Tan et al. | ................... 700/121 |
| 2002/0097426 | A1 | * | 7/2002 | Gusmano et al. | .......... 358/1.15 |

* cited by examiner

*Primary Examiner*—Ramesh Patel
(74) *Attorney, Agent, or Firm*—Dickstein Shapiro Morin & Oshinsky LLP

(57) ABSTRACT

Documents used for process control can be managed and maintained from a document server and a terminal. In order to update the documents quickly so that an operated process is always kept in the most preferable state of operation, the document server stores and manages production documents used for actually controlling and monitoring a control system plant, whereas the terminal system is used to refer and edit plant documents. The terminal can synchronize contents of the plant documents in the document server with those in the control system before storing the synchronized plant documents in the terminal.

13 Claims, 20 Drawing Sheets

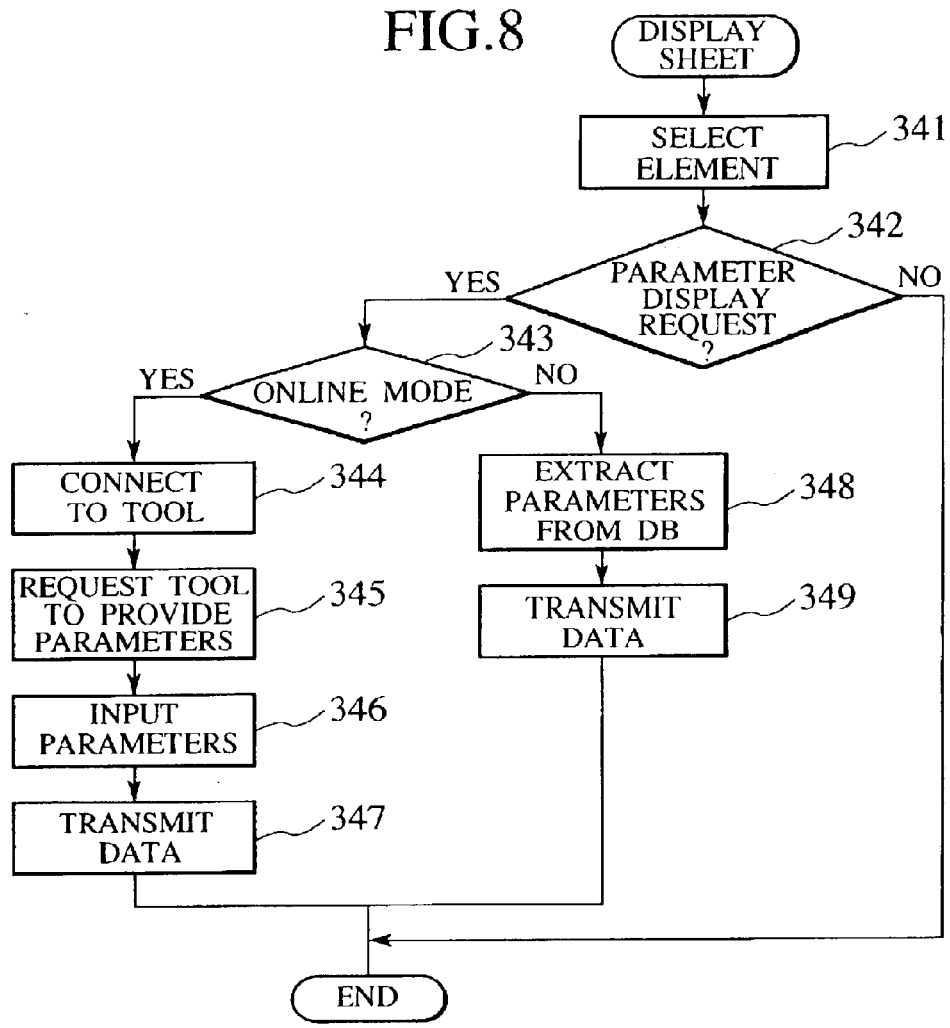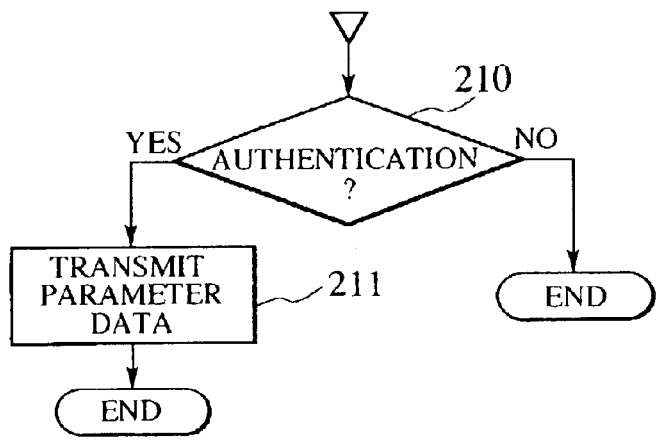

FIG.11

| USER | TERMINAL | LENT SHEET COUNT | RETURNED SHEET COUNT | ELEMENT ATTRIBUTE EDITING COUNT | ONLINE PARAMETER CHANGING COUNT | DISPLAYED SHEET COUNT |
|---|---|---|---|---|---|---|
|  |  |  |  |  |  |  |
|  |  |  |  |  |  |  |
|  |  |  |  |  |  |  |
|  |  |  |  |  |  |  |
|  |  |  |  |  |  |  |

FIG.12

| SHEET NAME | LENDING FLAG | TERMINAL TO WHICH SHEET IS LENT | LENDING DATA AND TIME |
|---|---|---|---|
| 1 |  |  |  |
| 2 |  |  |  |
| 3 |  |  |  |
| 4 |  |  |  |
| 5 |  |  |  |

| DRAWING NAME (3250) | UPDATE DATA AND TIME (3251) | THE NUMBER OF SEPARATE VOLUMES (3252) | SEPARATE VOLUME NAME (3253) |
|---|---|---|---|
| ** | ○○/○○/○○ ××:××:×× | n | AB, AC, AD··· |
| *△ | ○○/○○/○△ ×○:○○:△△ | m | CB, CD··· |
|  |  | k |  |
|  |  |  |  |
| ⋮ | ⋮ | ⋮ | ⋮ |

| SEPARATE VOLUME NAME (3253) | UPDATE DATA AND TIME (3251) | THE NUMBER OF SHEETS (3254) |
|---|---|---|
| ** | ○○/○○/○○ ×△:△△:○○ |  |
| *△ | ○○/○○/○△ ×△:××:○× |  |
| ⋮ | ⋮ | ⋮ |

FIG.21

| SHEET NO. ,3255 | UPDATE DATA AND TIME ,3252 | ACTUAL DEVICE SYNCHRONIZED DATA AND TIME ,3256 | STORING CONTROLLER NAME ,3257 |
|---|---|---|---|
| 01 | ○○/○○/○○ ××:××:×× | | CONTROLLER 1 |
| 02 | ○○/○○/○△ ×○:○○:△△ | | CONTROLLER 1 |
| 03 | | | CONTROLLER 2 |
| ⋮ | ⋮ | ⋮ | ⋮ |

FIG.22

| SHEET NO. ,3255 | ELEMENT NO. ,3258 | UPDATE DATA AND TIME ,3251 | ACTUAL DEVICE SYNCHRONIZED DATA AND TIME ,3256 | STORING CONTROLLER NAME ,3257 |
|---|---|---|---|---|
| 01 | 01 | ○○/○○/○○ ×△:△△:×△ | | CONTROLLER 1 |
| 02 | 02 | ○○/○○/○△ ×△:△△:○○ | | CONTROLLER 1 |
| 03 | 03 | | | CONTROLLER 2 |
| ⋮ | ⋮ | ⋮ | ⋮ | ⋮ |

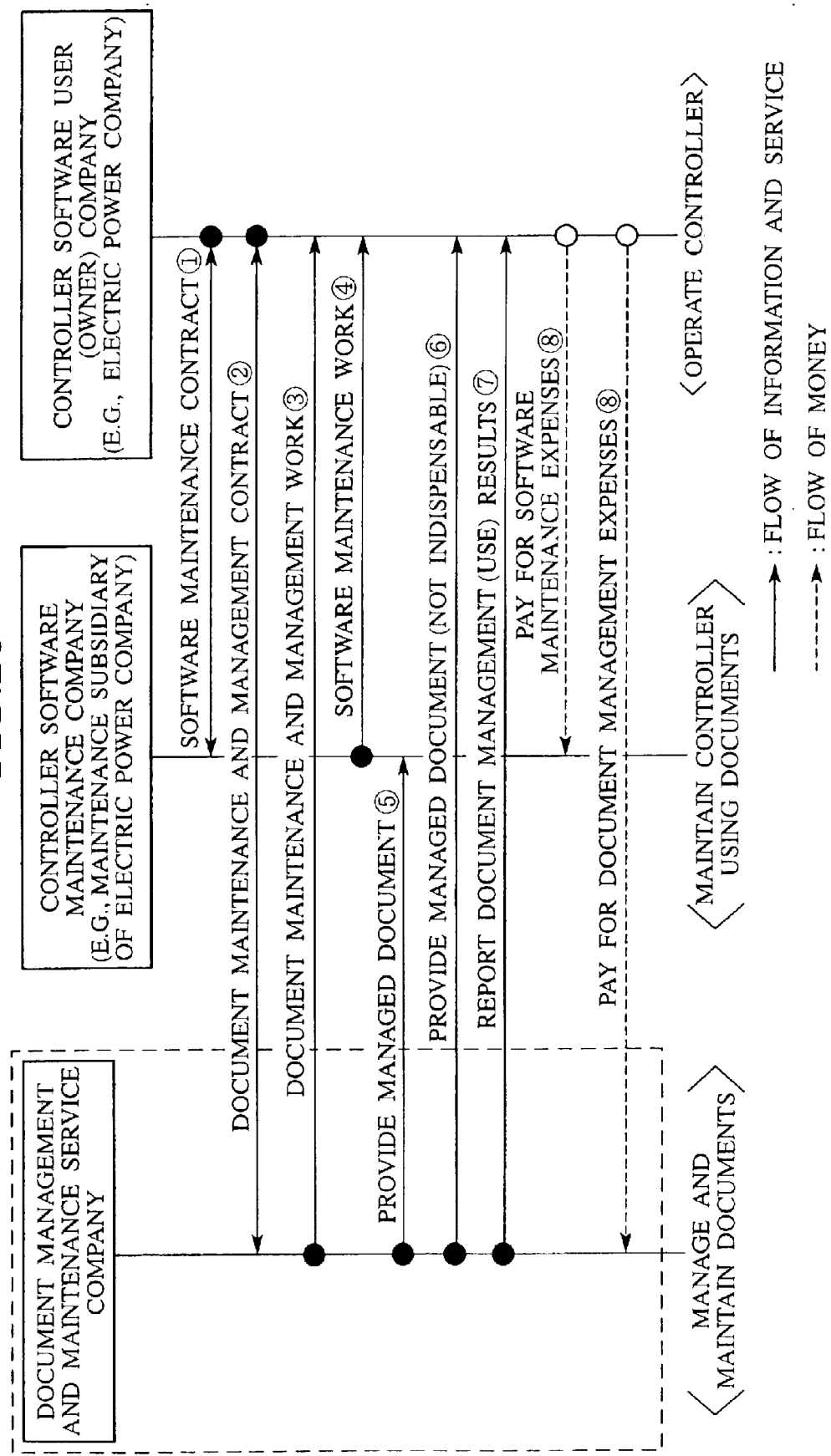

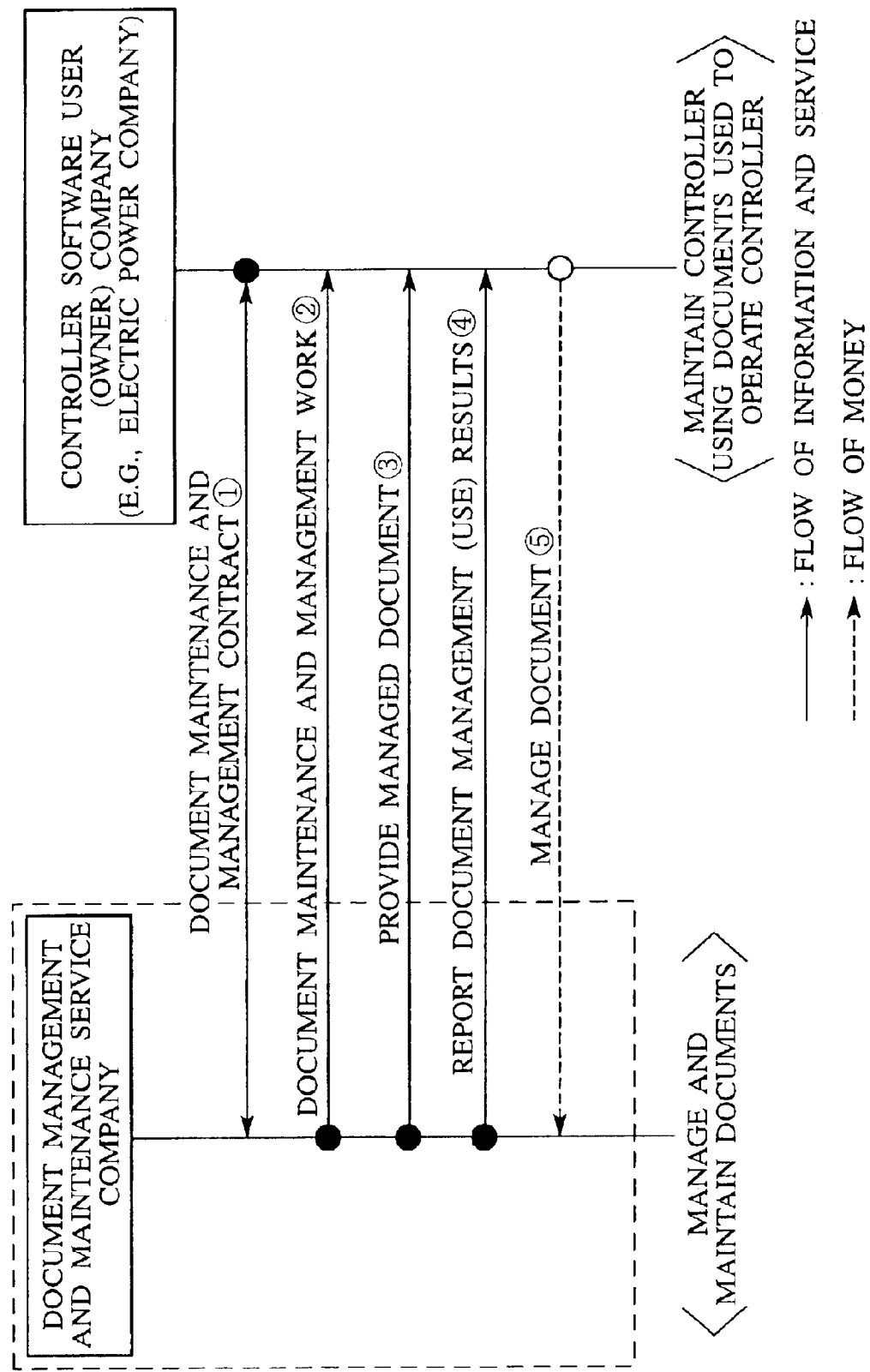

DOCUMENT MANAGEMENT SYSTEM AND METHOD

BACKGROUND OF THE INVENTION

The present invention relates to a document management system and a document management method.

Conventionally, control documents of a plant controller used in a plant such as a thermoelectric power plant, an atomic power plant, a chemical plant, and a water supply and sewerage plant are generally stored and managed by a company or the like, which owns and operates the plant. For this reason, the company or the like, which owns and operates the plant, not only operates the plant but also stores and manages the control documents which are software required for the operation of the plant. Accordingly, the company employs a staff member having technical knowledge which is different from the operation of the plant to assign the staff member to take charge of the storage, and the management, of the software.

Because control documents of the plant controller according to the prior art are stored and managed by the company or the like, which owns and operates the plant, the company must employ a staff member having technical knowledge which is different from the operation of the plant to assign the staff member to store and manage the control document. This produces a problem of expenses spared for the staff member, and a problem of enormous labor required for storing and managing the document.

SUMMARY OF THE INVENTION

An object of the present invention is to provide a document maintenance and management system which can solve the problems of the prior art by separating the storage, and the management, of control documents from the operation of a plant to enable quick update of the documents so that an operated process can always be kept in the most preferable state of operation.

According to the present invention, in order to solve the above-mentioned object, documents are collectively managed in the following manner. When the software maintenance tool of the controller performs operation such as a change, a modification, an addition, and a deletion of the control software of the controller, the result of the operation is reflected in documents of control circuit software, which are stored and managed by the document storing and managing device, on a document sheet basis, and the documents stored in the document storing and managing device of the control software of the controller and software of a description device included in the control system are managed in association with each other, thereby allowing the documents of the control circuit software, which are stored and managed by the document storing and managing device, to be referred to on a document sheet from the software maintenance tool.

According to another aspect of the present invention, there is provided a document management system, comprising: a document storing and managing device; and terminal equipment which performs document referring work or document editing work independently of the document storing and managing device, wherein the documents which describe the control software of the controller are stored in the document storing and managing device and in the terminal equipment, and contents of the document stored in the document storing and managing device are the same as those stored in the terminal equipment; the document is constituted of a plurality of document sheets which can be referred to and edited, the plurality of sheets constituting a drawing; the drawing can be divided into separate volumes, each of which is constituted of one or more sheets; the document is created in a unit of the storage of a computer and a control device for the controller where a control circuit is stored, or on a control operation attribute basis and on an element display attribute basis, the attributes being given to each drawing as a set of separate volumes, separate volumes and document sheets, and being given to each element in the document sheet; and, the terminal equipment performs synchronization work of documents on a document basis, for each attribute classification of an element in the document, or in a unit of the storage of a computer and a control device for the controller where the documents are actually stored.

BRIEF DESCRIPTION OF THE DRAWINGS

Other objects and advantages of the invention will become apparent from the following description of embodiments with reference to the accompanying drawings in which:

FIG. 8 is a flowchart illustrating processing of the document server, which is performed when a request to edit and change parameters (attributes) of an element in a sheet is made while the sheet is displayed and edited in a terminal system 3;

FIG. 9 is a flowchart illustrating processing in a maintenance tool of a plant, which is performed when an element parameter request is received from the document server;

FIG. 11 is a diagram illustrating a configuration of a quantity-used count table;

FIG. 12 is a diagram illustrating a configuration of a lending management table;

FIG. 21 is a diagram illustrating a configuration of a sheet update information table in a separate volume of a drawing, which is given to each plant document included in the system, according to another embodiment;

FIG. 22 is a diagram illustrating a configuration of an element update information table in a sheet in a separate volume of a drawing, which is given to each plant document included in the system, according to another embodiment;

FIG. 26 is a diagram illustrating an example in which the document storing and managing system shown in FIG. 1 is applied to business; and FIG. 27 is a diagram illustrating another example in which the document storing and managing system shown in FIG. 1 is applied to business.

DETAILED DESCRIPTION OF THE PREFERRED EMBODIMENTS

Embodiments of a document maintenance and management system according to the present invention will be described in detail with reference to drawings below.

Figure 1:
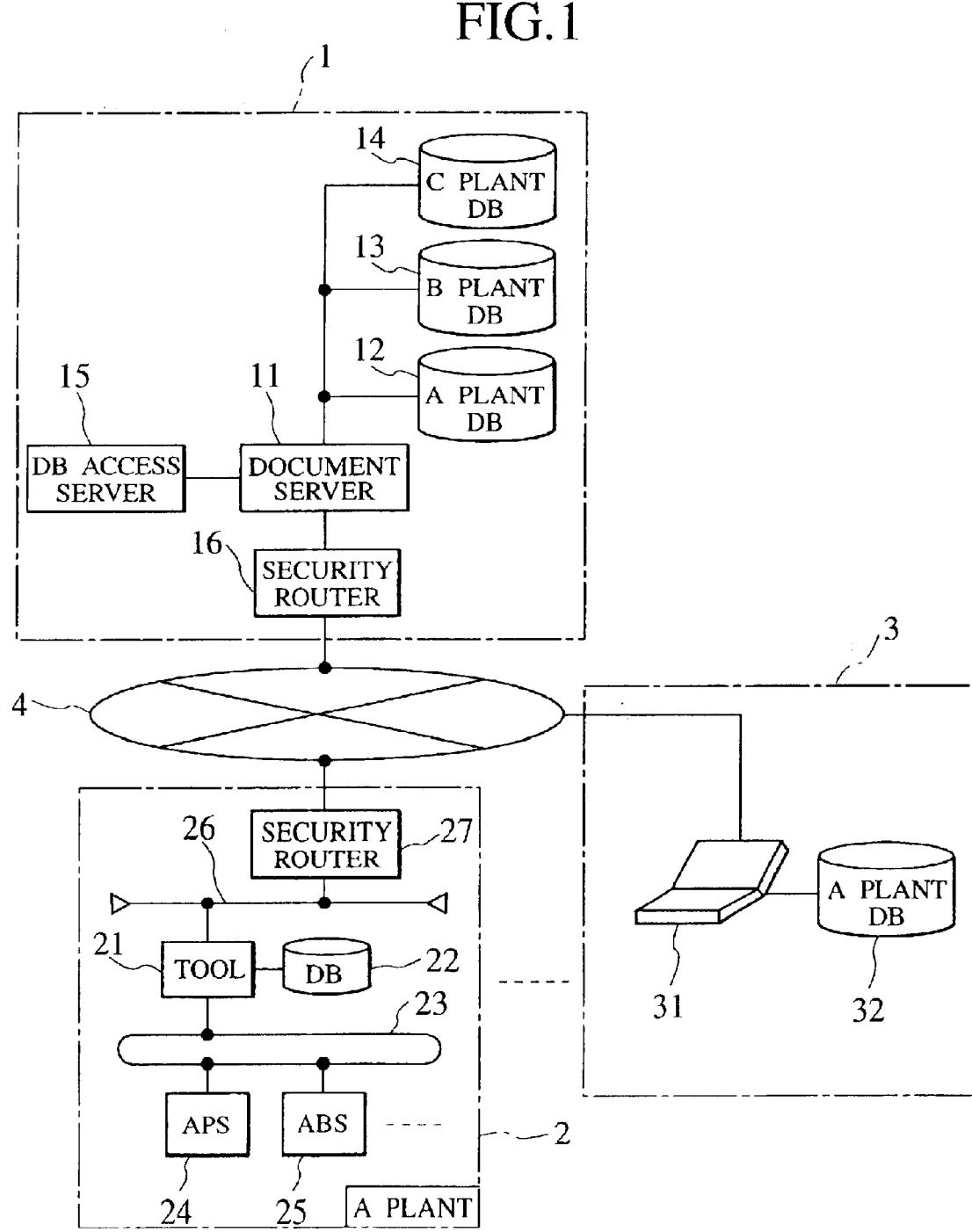
FIG. 1 is a block diagram illustrating a configuration of a document storing and managing system according to one embodiment of the present invention.

FIG. 1 is a block diagram illustrating a configuration of a document storing and managing system according to one embodiment of the present invention. In FIG. 1, reference numerals 1 is a document server 1; reference numeral 2 is a control system; reference numeral 3 is a terminal system; reference numeral 4 is a communication line; reference numeral 11 is a document server main body; reference numerals 12 through 14 and 32 are plant document DBs; reference numeral 15 is a DB access server; reference numerals 16 and 27 are security routers; reference numeral 21 is a maintenance tool; reference numeral 22 is a DB; reference numerals 23 and 26 are networks; reference numeral 24 is an APS (automatic plant control system); reference numeral 25 is an ABS (automatic burner control system); and reference numeral 31 is distributed terminal equipment.

As shown in FIG. 1, the document maintenance and management system has a configuration in which the document server 1, the control system 2, and the plurality of terminal systems 3 which are distributed among several locations are connected to the communication line 4 so that they can be mutually connected through the communication line 4 such as a public communication network.

The document server 1 is installed in a manufacturer of the control system 2, and stores production documents of the control system 2. The control system 2 is installed in a plant, and actually controls and monitors the plant. In addition, the terminal system 3 is installed in a department which performs operation, and maintenance, of the plant; or the terminal system 3 may also be carried as a portable terminal which an operator of the plant can use in a mobile environment. This terminal 3 is configured to hold plant documents, contents of which are synchronized with those of plant documents in the document server 1, in the terminal 3 so that the operator can refer and edit the plant documents.

The document server 1 comprises the following: the document server main body 11; a security router 16 which protects against an unauthorized access through the communication line 4; the DB access server 15 which keeps track of types, and the number of times, of accesses to a DB; and the plant document DBs 12 through 15 which store plant documents as design information about control systems of a plurality of plants.

The control system 2 of the plant comprises the following: a process controller such as APS 24 and ABS 25; the maintenance tool 21 having functions such as holding of the software, loading of the software, online change of the software, and comparison for synchronization; a DB 22 for storing design documents which are synchronized with software included in the controllers 24, 25, etc., which is stored in the maintenance tool 21; a network 23 through which the maintenance tool 21, the controllers 24, 25 and the like are connected; a security router 27 which protects against an unauthorized access through the communication line 4; and a network 26 through which the maintenance tool 21 is connected.

The terminal system 3 comprises the distributed terminal equipment 31 and the plant document DB 32 for storing design documents an operator intends to use in the terminal system 3.

Figure 2:
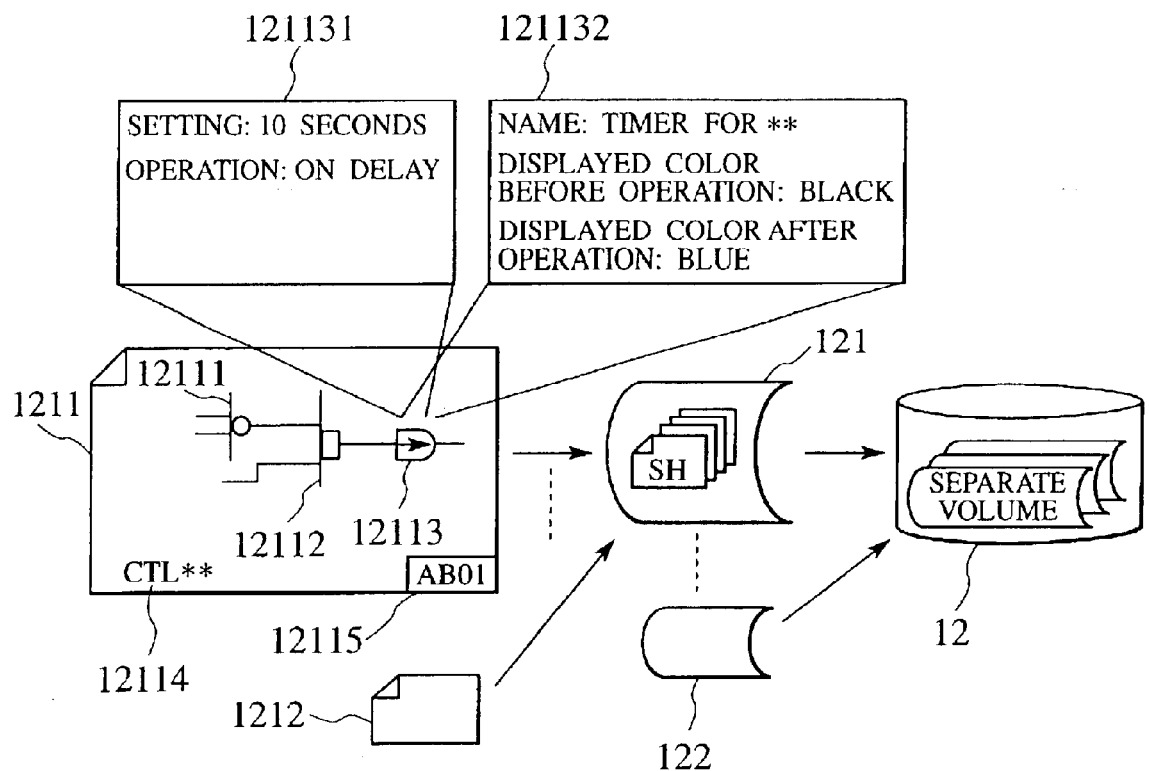
FIG. 2 is a diagram illustrating a configuration of design documents of a plant controller as an example.

FIG. 2 is a diagram illustrating a configuration of design documents of the controllers 24, 25 as an example. It is to be noted that although the design documents as described below may be stored in the document server 1, the control system 2 or a DB in the terminal system 3, the design documents are illustrated here on the assumption that they are stored in an A plant DB 12 in the document server 1.

The design documents are collected as "diagrams" for each plant controller such as APS 24 or ABS 25, and are then stored in the plant DB 12. The diagrams consist of a plurality of separate volumes 121, 122. In the separate volume, control document sheets (SH) 1211, 1212 for detection edges and operation edges such as a valve, a motor, a pressure gage, a thermometer, and a flowmeter are collected on a control target basis (such as water, fuel, and air) for each process of a plant. A control circuit shown in the control document sheet 1211 is described as a CPU name 12114 of an actual built-in controller, and as its sheet name 12115. In addition, how the control circuit controls is described by elements of OR 12111, AND 12112, a timer 12113 and the like, which describe its operation, and by their connected topology. Each of the elements, which indicates each control operation, is provided with operation attributes 121131. For example, if the element is a timer, a time-out period of operation, and the operation, are described. If the element is an integrator, a time constant, a gain and the like are described as its attributes. Moreover, in the control document sheet 1211, specification attributes 121132 such as a name of the element, color change specifications on the basis of operation modes can also be described so that an operator can keep track of the operation on the document.

Figure 3:
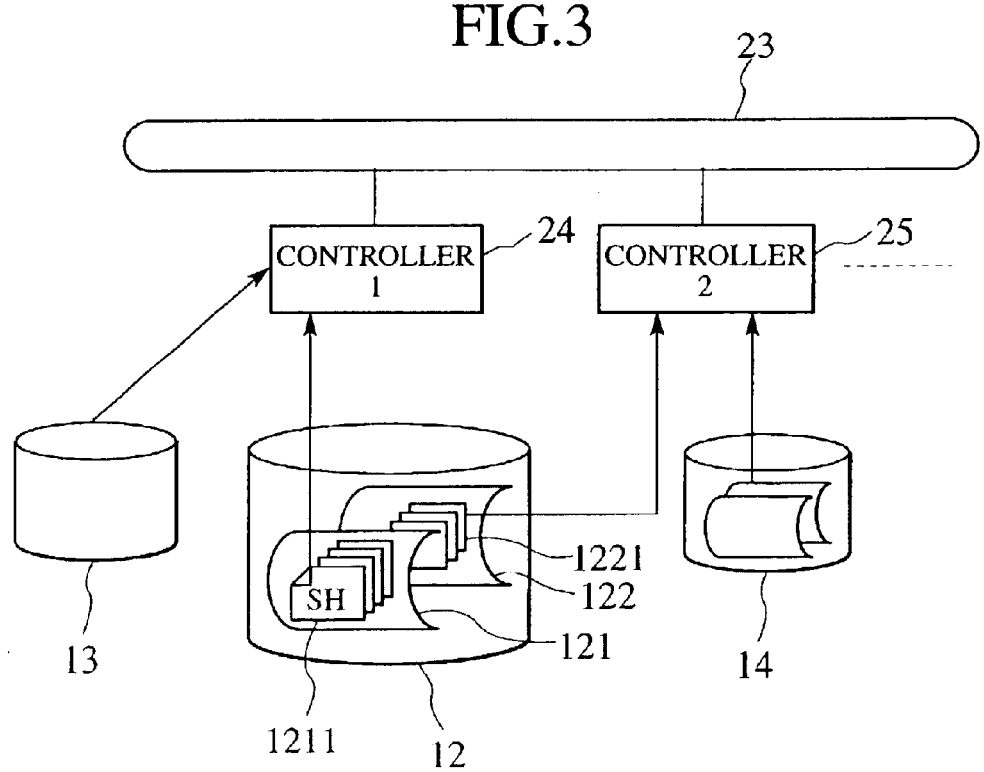
FIG. 3 is a diagram illustrating the correlation between the design documents and the plant controller.

FIG. 3 is a diagram illustrating the correlation between the design documents and the controllers such as the APS and ABS.

A document which is stored in the DB 12 as a diagram is loaded into a controller CPU 1 in the APS 24 so that the document can operate. In a similar manner, a document which is stored in the DB 14 as a diagram is loaded into a controller CPU 2 in the APS 25 so that the document can operate. In this case, as for the documents stored in the DB 12, a certain sheet 1211 of a certain separate volume 121 is loaded into the controller CPU 1, and a certain sheet 1221 of a certain separate volume 122 is loaded into the controller CPU 2, before they operate. As described above, depending on a kind of process, control covering a plurality of controllers or a plurality of controller CPUs may be required.

Figure 4:
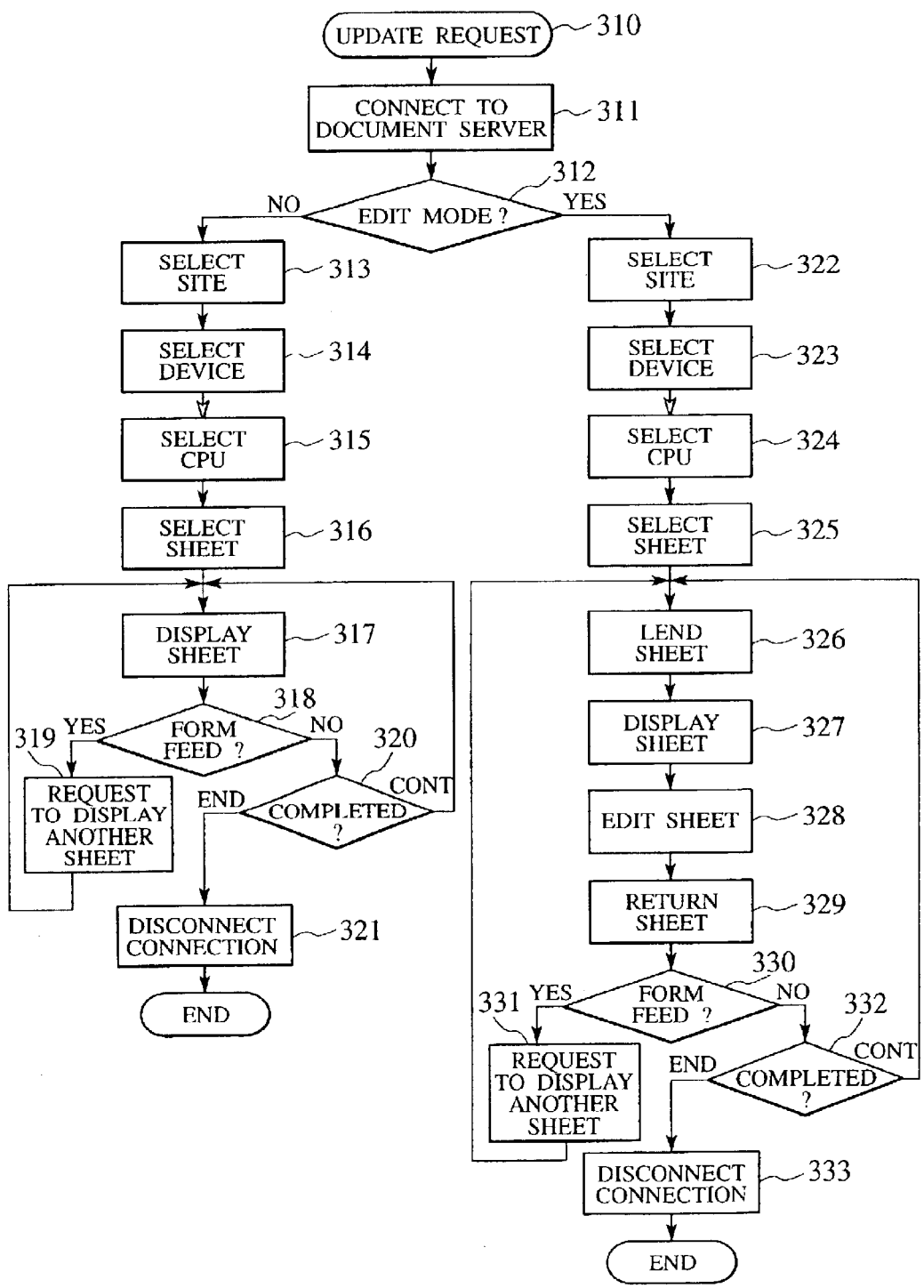
FIG. 4 is a flowchart illustrating processing by which when a distributed terminal displays and edits a document, data of the document is obtained and the data is returned for update.

FIG. 4 is a flowchart illustrating processing by which when the terminal system 3 displays and edits a document, data of the document is obtained, and the data is returned for update. The processing will be described below.

(1) Upon reception of an update request from an operator, the terminal system 3 sends a connection request to the document server 1 so that the terminal system 3 is connected to the document server 1 (steps 310, 311).

(2) The document server 1 judges whether or not the request sent from the terminal system 3 which has been connected is an edit mode. To be more specific, the document server 1 judges the request to be a request made for display purpose only, or to be a request made for the purpose of editing (step 312).

(3) As a result of the judgment in step 312, if the request is judged to be display only, the document server 1 selects a site of a plant, which is requested to perform the display, from among documents stored in the own server, and then selects a device which is requested to perform the display. Further, the document server 1 selects a controller CPU of the controller, which is requested to perform the display, from among controller CPUs (steps 313 through 315).

(4) After that, the document server 1 selects a sheet (SH) of a document, which is stored in this controller, and then transmits information about the sheet to the terminal system 3 to display the sheet (steps 316, 317).

(5) After looking through the displayed sheet, the operator decides whether or not the operator requests a form feed specification of the sheet. If the operator decides to request a form feed, in order to specify the form feed, the operator requests the display of other appropriate sheets to be requested before returning to step 317 where the sheet to be displayed next is transmitted from the document server 1 to the terminal system 3 (steps 318, 319).

(6) If the operator does not request a form feed specification in step 318, the operator decides whether or not the operator ends the processing. If the operator does not decide to end the processing, the process returns to step 317 where the sheet is displayed. If the operator decides to end the processing, the connection of the terminal system 3 to the document server 1 is disconnected before the display processing of the sheet ends (steps 320, 321).

(7) In addition, if the result of the edit mode judgment in step 312 is the editing, the document server 1 selects a site of a plant, which is requested to perform the display, from among documents stored in the own server, and then selects a device which is requested to perform the display. Further, the document server 1 selects a controller CPU of the controller, which is requested to perform the display, from among the controller CPUs (steps 322 through 324).

(8) After that, the document server 1 selects a sheet (SH) of a document, which is stored in this controller, and then requests lending of the sheet to obtain the sheet. The document server 1 transmits information of the sheet to the terminal system 3 to display the sheet (steps 325 through 327).

(9) After the operator edits the displayed sheet and requests the return of the edited sheet, the terminal system 3 transmits the sheet after the edition to the document server 1 so that the sheet is returned (steps 328, 329).

(10) The operator decides whether or not to request a form feed specification of the sheet in order to edit other sheets. If the operator decides to request a form feed, the operator requests display for the form feed specification before returning to the processing from step 326 where other sheets to be requested is lent (steps 330, 331).

(11) If the operator does not request a form feed specification in step 330, the operator decides whether or not to ends the processing. If the operator does not decide to end the processing, the process returns to step 326 where the sheet is lent. If the operator decides to end the processing, the connection of the terminal system 3 to the document server 1 is disconnected before the edit processing of the sheet ends (steps 332, 333).

Figure 5:
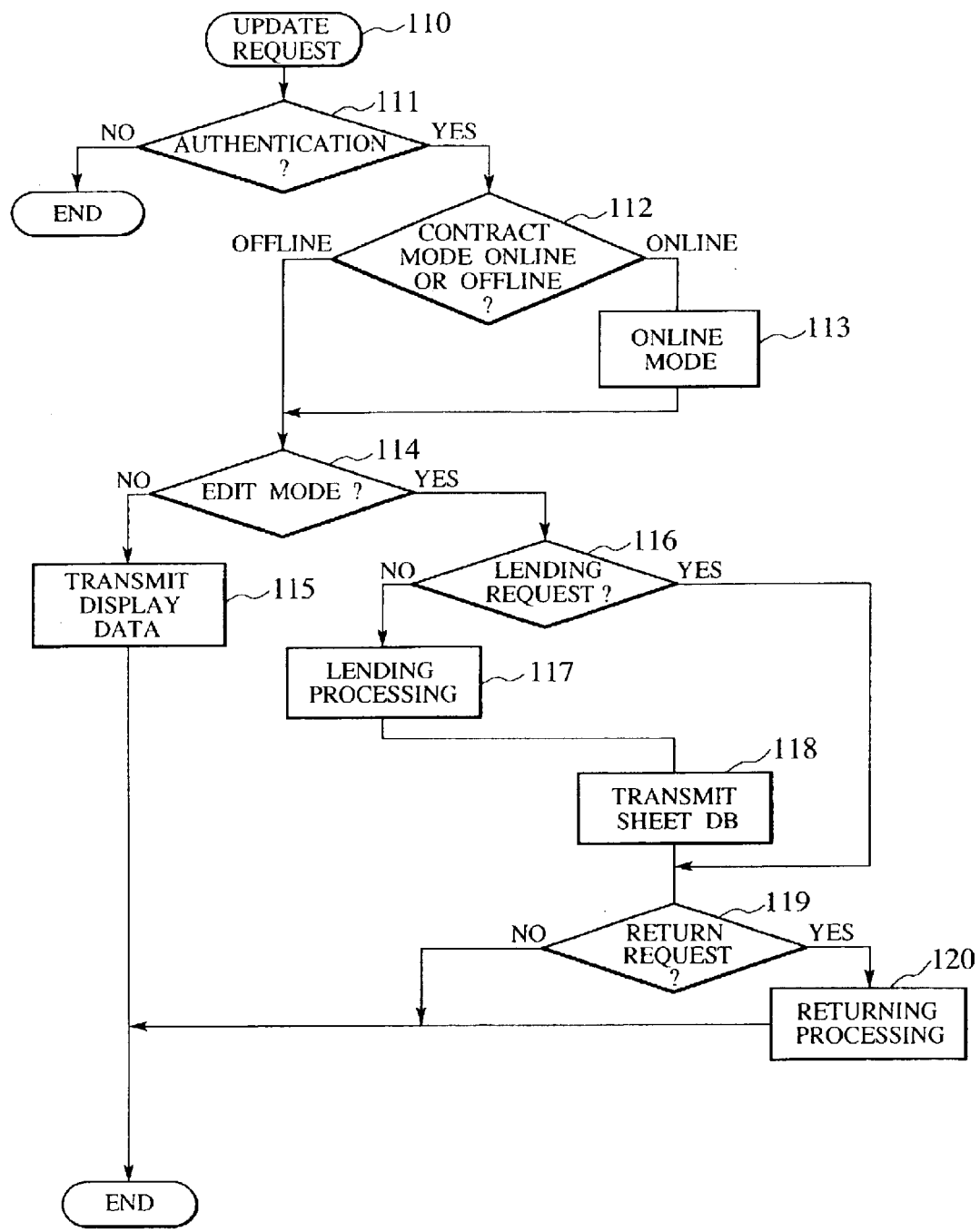
FIG. 5 is a flowchart illustrating processing by which when an update request is sent from the distributed terminal to a document server, sheet data is lent, and the sheet data is returned for update.

FIG. 5 is a flowchart illustrating processing by which when an update request is sent from the terminal system 3 to the document server 1, sheet data is lent, and the sheet data is returned. The processing will be described below.

An example of the processing describe here is based on the assumption that the document server 1 inputs operation attributes of elements, which operate in an actual controller, to update the operation attributes at intervals of a certain fixed period of time or when an event occurs. Therefore, at a certain point of time before they are synchronized, there is a possibility that descriptive contents of a document in the plant document DB in the document server 1 may differ temporarily from those of the actual controller operating in the plant. Accordingly, it is assumed that the terminal system 3 is provided with a level (authority) for access to the maintenance tool 21. In other words, the terminal system 3 is allowed to access the maintenance tool 21 in an offline mode which permits the terminal system 3 to obtain data in the document server 1 only, or in an online mode used for strict synchronization with really operating document in the controller of the plant. The level is prescribed for each terminal according to a contract.

(1) Upon reception of an update request from the terminal system 3, the document server 1 authenticates the terminal system 3 which has sent the update request. If the authentication results in failure, nothing is performed before the processing ends (steps 110, 111).

(2) If the authentication in step ill results in success (OK), a contract mode of the terminal system 3 is checked to see which contract mode the terminal system 3 is provided with, an online mode or an offline mode. If it is online, the online mode is stored (steps 112, 113).

(3) After the processing in step 113, or if it is found out in step 112 that the contract mode of the terminal system 3 is offline, a judgment is made as to whether or not it is an edit mode. As a result, if it is not the edit mode, it is processed as a display mode for reference purpose only; and data of the requested sheet, which is used for displaying the sheet, is sent to the terminal system 3 before ending the processing. It is to be noted that if it is found out in step 112 that the contract mode of the terminal system 3 is offline, it is not judged to be the edit mode (steps 114, 115).

(4) If it is judged to be the edit mode in step 114, a judgment is made as to whether or not a lending request is made. If the request is judged to be the lending request, lending processing of information about a requested appropriate sheet is performed to lend and send the sheet data from the document server 1 to the terminal system 3 (steps 116 through 118).

(5) If the request is not judged to be the lending request as a result of the judgment in step 116, or after sending the sheet information in step 118, whether or not a return request is made is monitored. If the return request is made, return processing is performed. If the return request is not made, the processing ends (steps 119, 120).

Figure 6:
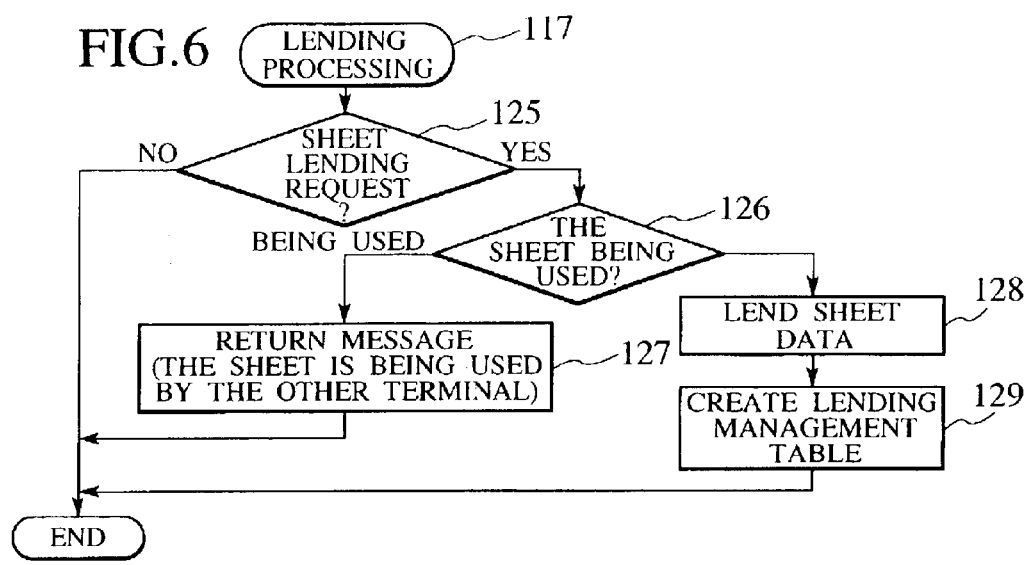
FIG. 6 is a flowchart illustrating an operation example of lending processing of document data from document DBs of the document server (step 117 in FIG. 5)

FIG. 6 is a flowchart illustrating an operation example of the lending processing (in step 117 in FIG. 5) of document data from the document DBs 12 through 14 of the document server 1. The processing will be described below.

(1) Upon reception of a lending request of document data from the terminal system 3, the document server 1 refers to a lending management table described later to judge whether or not the appropriate sheet is being lent. To be more specific, a judgment is made as to whether or not the appropriate sheet is being used because the sheet is being lent to another terminal or for some reason (steps 125, 126).

(2) As a result of the judgment in step 126, if the appropriate sheet is being used because the sheet is being lent to another terminal or for some reason, the document server 1 transmits a message to the terminal system 3 to the effect that the sheet cannot be lent, before the processing ends (step 127).

(2) As a result of the judgment in step 126, if the appropriate sheet can be lent, the document server 1 executes lending processing so as to lend sheet data to the terminal system 3, and then registers the lending in the lending management table (steps 128, 129).

Figure 7:
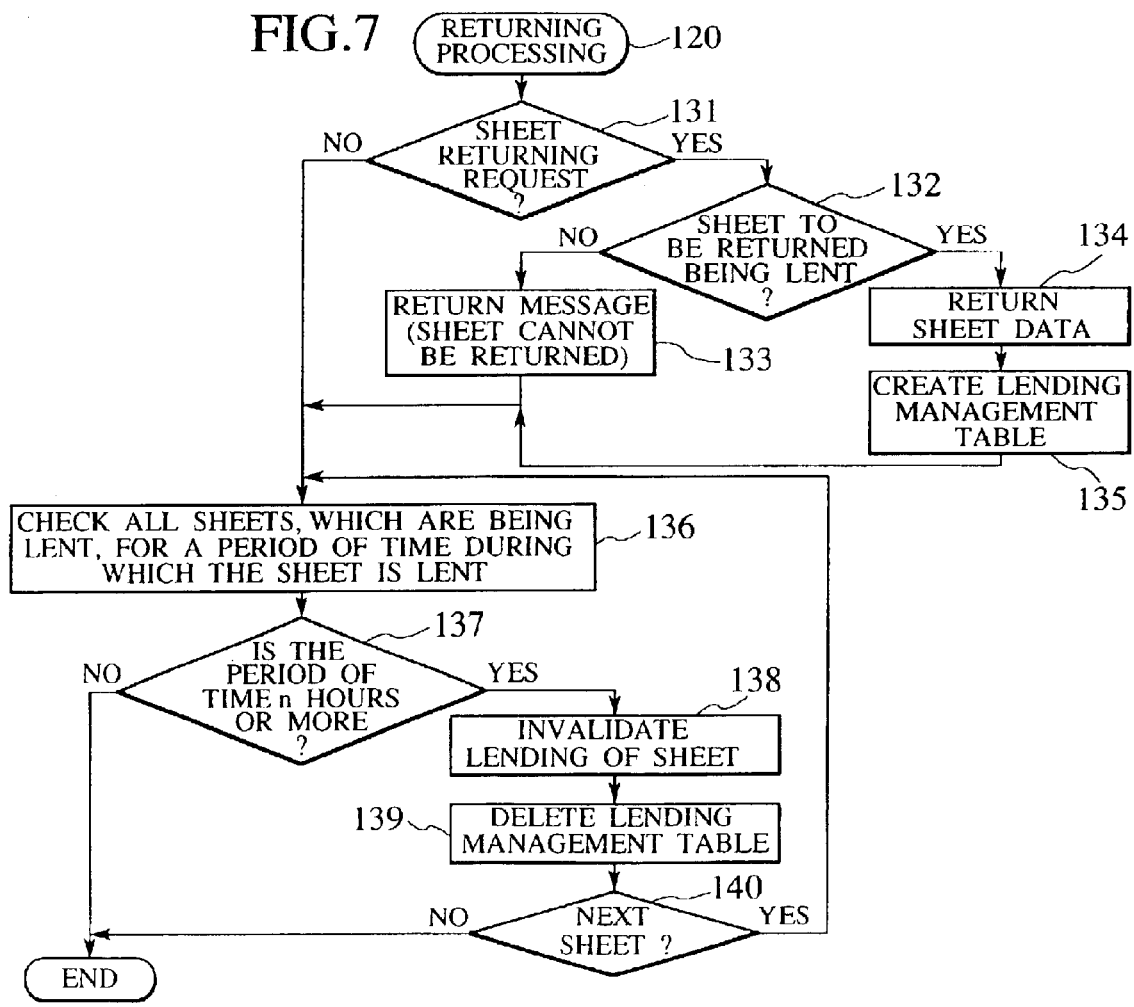
FIG. 7 is a flowchart illustrating an operation example of returning processing performed when document data edited in the distributed terminal is returned to the document DBs of the document server (step 120 in FIG. 5)

FIG. 7 is a flowchart illustrating an operation example of the returning processing (step 120 in FIG. 5) executed when returning document data, which has been edited in the terminal system 3, to the document DBs 12 through 14 of the document server 1. The processing will be described below.

(1) Upon reception of a returning request of document data from the terminal system 3, the document server 1 judges whether or not the return of document data which is being lent to the appropriate terminal system 3 is requested. If not, the document server 1 transmits a message to the terminal system 3 as a requester to the effect that the return is not possible (steps 131 through 133).

(2) In step 132, if document data to be returned is being lent to the terminal system 3, the returning processing is executed to return sheet data, and then information indicating that the sheet data is being lent is deleted from the lending management table (steps 134, 135).

(3) In addition, during the processing described above, the document server 1 checks one of sheets which are being lent for a lending period, that is to say, a period of time during which it is lent, and then judges whether or not a certain predetermined time-out period expires. If there is no sheet, a lending time-out period of which expires, the processing ends (steps 136, 137).

(4) As a result of the check in step 137, if the lending time-out period expires, the lending of the sheet is invalidated. In addition to it, information indicating that the sheet is being lent is deleted from the lending management table (steps 138, 139).

(5) Whether or not there is another sheet being lent is checked. If there is a sheet being lent, the processing from step 136 is repeatedly executed for the next sheet. If there is no sheet being lent, the processing ends (step 140).

FIG. 8 is a flowchart illustrating processing of the document server 1, which is performed when a request to edit and change parameters (attributes) of an element in a sheet is made while the sheet is displayed and edited in the terminal system 3. The processing will be described below.

(1) Upon reception of a request to select an element (step 341) and change its parameters from the terminal system 3 which is displaying a sheet, the document server 1 judges whether or not a contract mode of the terminal system 3 is the online mode (steps 340 through 343).

(2) As a result of the judgment in step 343, if the contract mode of the terminal system 3 is the online mode, the document server 1 establishes a connection to the maintenance tool 21 of the plant, and requests this maintenance tool 21 to provide parameters of the appropriate element (steps 344, 345).

(3) The document server 1 reads the requested parameters from the maintenance tool 21, and then transmits the read parameters to the terminal system 3 before ending the processing (steps 346, 347).

(4) As a result of the judgment in step 343, if the contract mode of the terminal system 3 is not the online mode, in other words, if it is the offline mode, the document server 1 extracts parameters of the appropriate element from the own document DBs 12 through 14, and then transmits the parameters to the terminal system 3 as a requester before ending the processing (steps 348, 349).

FIG. 9 is a flowchart illustrating processing in the maintenance tool 21 of the plant, which is performed when an element parameter request is received from the document server 1. Upon reception of the parameter request, the maintenance tool 21 performs the authentication processing 210. If the parameter request is an authorized access, the maintenance tool sends the requested parameters of the appropriate element to the document server 1 (step 211).

Figure 10:
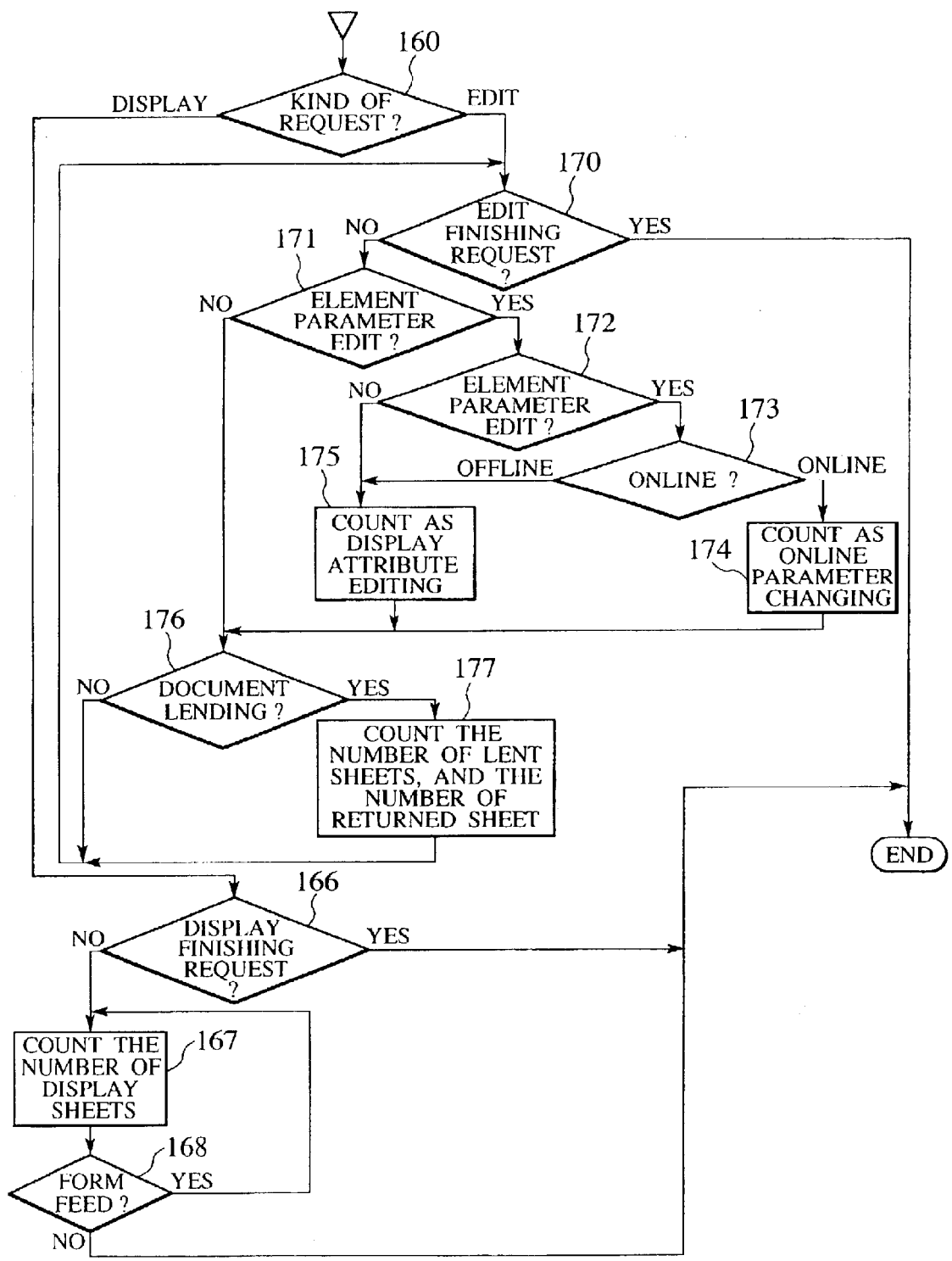
FIG. 10 is a flowchart illustrating count processing of the quantity used, which is performed when the distributed terminal lends a document stored in the document server in order to display and edit the document.

FIG. 10 is a flowchart illustrating processing of counting the amount of use, which is performed when the terminal system 3 lends a document stored in the document server 1 in order to display and edit the document. FIG. 11 is a diagram illustrating a configuration of a quantity-used count table. The count processing and the configuration will be described as below. An example which will be described here is based on the assumption that the amount of documents used is kept track of by the number of sheets which have been used and by how to use the sheets (display and editing, or display only).

(1) Every time a sheet data request is issued from the terminal system 3, the document server 1 judges a kind of the request. If the request is judged to be a display-only request, the document server 1 displays until the display request is terminated. In this case, at every form feed, the document server 1 counts the number of sheets to update the count in the quantity-used count table (steps 160, and 166 through 168).

(2) As a result of the judgment in step 160, if the kind of the request is editing, a judgment is made as to whether or not an edit finishing request is issued. If the edit finishing request is issued, the processing here ends (step 170).

(3) In step 170, if the edit finishing request is not issued, a judgment is made as to whether or not it is element attribute editing. If it is the element attribute editing, then a judgment is made as to whether or not it is element parameter editing. As a result, if it is the element parameter editing, a judgment is made as to whether or not a contract mode is online (steps 171 through 173).

(4) As a result of the judgment in step 173, if the contract mode is online, the document server 1 counts as the online parameter changing to update the count in the quantity-used count table. If the contract mode is offline, or if it is not the element parameter editing as a result of the judgment in step 172, the document server 1 counts as the element attribute editing to update the count in the quantity-used count table (steps 174, 175).

(5) If it is not the element attribute editing as a result of the judgment in step 171, or if it is judged after the processing in steps 174, 175 that a request to lend a document including sheet data is made, the document server 1 counts the number of lent sheets and the number of returned sheets to store the numbers in the quantity-used count table (steps 176, 177).

(6) After the processing in step 177, or if it is judged as a result of the judgment in step 176 that the request to lend the document is not made, the processing from step 170 is repeated.

As shown in FIG. 11, the quantity-used count table used in the above-mentioned processing is configured to store records, each of which comprises the following fields: a user 1100 who uses the quantity-used count table; a terminal 1101 which is a requester; a lent sheet count 1102; a returned sheet count 1103; an element attribute editing count 1104; an online parameter changing count 1105; and a displayed sheet count 1106.

FIG. 12 is a diagram illustrating a configuration of the lending management table. This lending management table is configured to store records, each of which comprises the following fields: a sheet name 1110; a lending flag 1111 indicating that an appropriate sheet is being lent; a distributed terminal 1112 to which the sheet is lent; and lending date and time 1113. It is to be noted that this table is used in the process flows described in FIGS. 6 and 7.

In the embodiment described above, if the terminal system 3 refers to a document of control circuit software of a controller, the terminal system 3 can fetch an operating state of a signal obtained in the controller to superimpose this state on a displayed document of the control circuit software. In this case, the number of times the document is referred to is a value counted every time the sheet is referred to, for example, when the document is newly displayed, and at the time of a form feed, and also a value counted every time a period of time during which the signal operating state of the controller is superimposed is referred to.

According to the embodiment described above, documents used for the process control in the control system 2 can be managed and maintained from the document server 1 and the terminal system 3. In addition, the documents can be updated quickly, and an operated process can always be kept in the most preferable state of operation.

Next, an example showing how a document storing and managing system for storing and managing documents used for plant control, and a document maintaining and managing method for maintaining and managing documents used for plant control, according to the above-mentioned embodiment are applied to business will be described.

Figure 13:
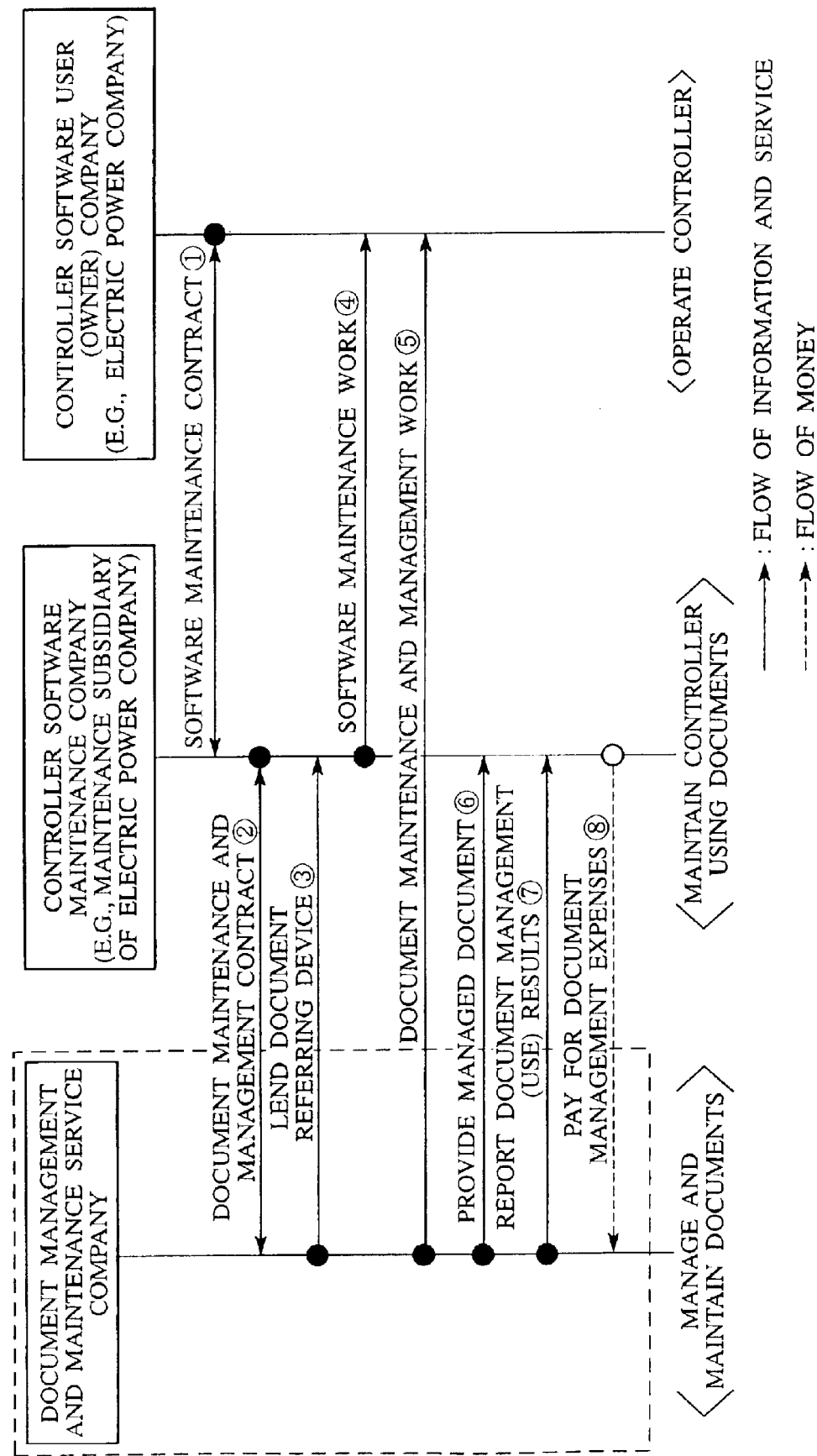
FIG. 13 is a diagram illustrating an example in which the document storing and managing system shown in FIG. 1 is applied to business.

FIG. 13 is a diagram illustrating an example in which the document storing and managing system shown in FIG. 1 is applied to business. In FIG. 13, a controller software user (owner) company has the control system 2, and operates and controls, for example, processes of an electric power producing facility using documents. A document management and maintenance service company has the document server 1, and provides management and maintenance services of documents according to a contract with the controller software user (owner) company. In addition, a controller software maintenance company has the terminal system 3, and performs maintenance work of software which is a control document used by the controller software user (owner) company.

In the above description, the controller software user (owner) company and the controller software maintenance company make a software maintenance contract ① with each other to the effect that the controller software maintenance company maintains software possessed by the controller software user (owner) company. Further, the controller software maintenance company and the document management and maintenance service company make a document maintenance and management contract ② with each other to the effect that the document management and maintenance service company manages and maintains documents which are software possessed by the controller software user (owner) company. Additionally, the document management and maintenance service company lends a document referring device ③ to the controller software maintenance company.

After the above-mentioned contract is made, the controller software maintenance company uses the lent referring device to execute maintenance work ④ of software which the controller software user (owner) company uses in the control system 2 for controlling a process, etc. On the other hand, the document management and maintenance service company uses the document server 1, which is operated in house, to execute maintenance and management work ⑤ of documents which the controller software user (owner) company uses in the control system 2 for controlling a process, etc.

The above-mentioned items ④ and ⑤ are performed periodically or at any time as needed. Additionally, the document management and maintenance service company provides the controller software maintenance company with management documents ⑥.

Moreover, the document management and maintenance service company reports actual document management (use) results ⑦ to the controller software maintenance company at fixed intervals. The controller software maintenance company pays for document management expenses ⑧ to the document management and maintenance service company according to the report on the results ⑦.

Figure 14:
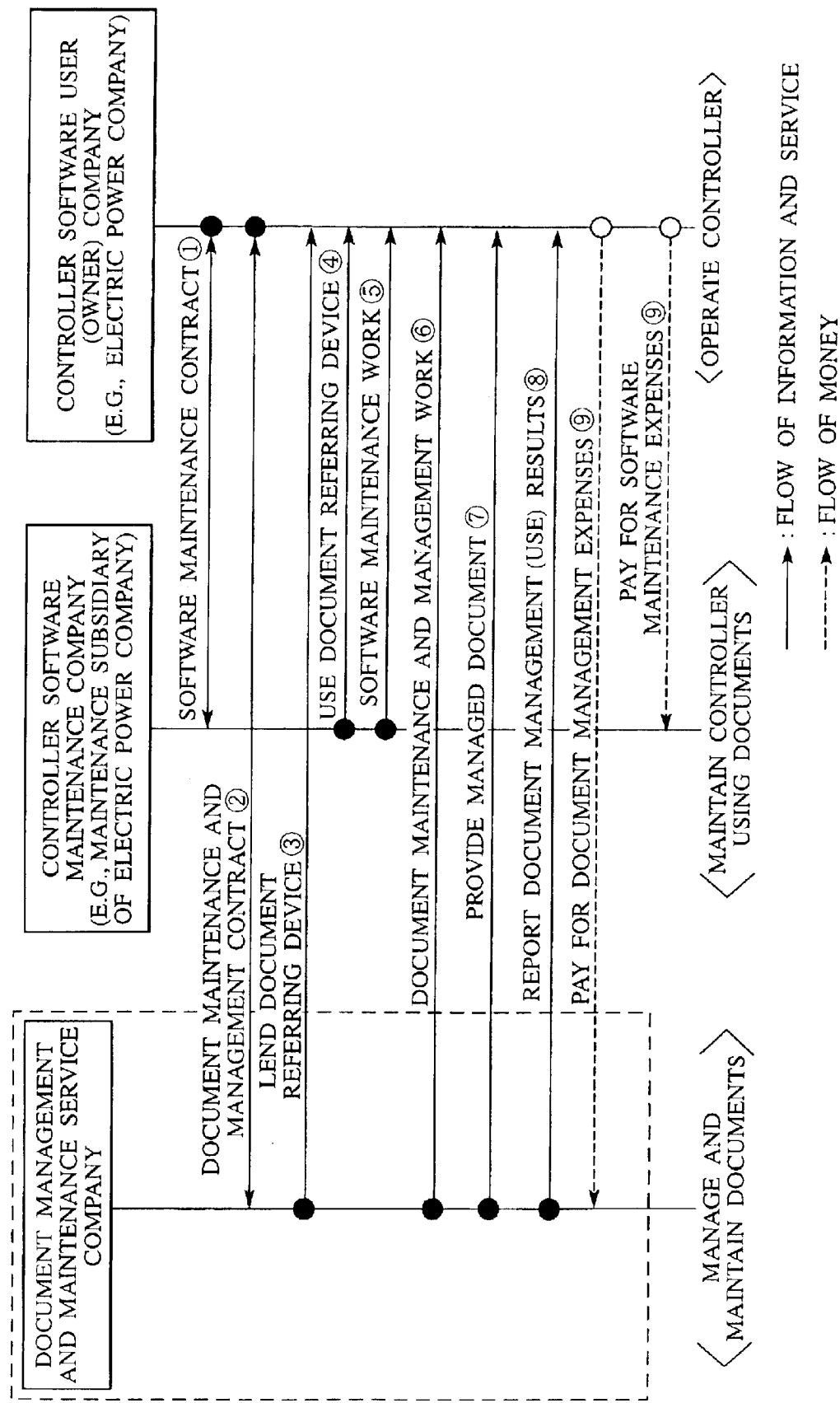
FIG. 14 is a diagram illustrating another example in which the document storing and managing system shown in FIG. 1 is applied to business.

FIG. 14 is a diagram illustrating another example in which the document storing and managing system shown in FIG. 1 is applied to business. The relationship among the controller software user (owner) company, the controller software maintenance company, and the document management and maintenance service company, which is shown in FIG. 14, is the same as that described in FIG. 13.

In the example shown in FIG. 14, the controller software user (owner) company and the controller software maintenance company also make a software maintenance contract ① with each other to the effect that the controller software maintenance company maintains software possessed by the controller software user (owner) company. Further, the controller software user (owner) company and the document management and maintenance service company make a document maintenance and management contract ② with each other to the effect that the document management and maintenance service company manages and maintains documents which are software possessed by the controller software user (owner) company. After the above-mentioned contract is made, the document management and maintenance service company lends the document referring device to the controller software user (owner) company ③.

The controller software maintenance company uses the document referring device ④, which has been lent to the controller software user (owner) company, to execute maintenance work ⑤ of software which the controller software user (owner) company uses in the control system 2 for controlling a process, etc. On the other hand, the document management and maintenance service company uses the document server 1, which is operated in house, to execute maintenance and management work ⑥ of documents which the controller software user (owner) company uses in the control system 2 for controlling a process, etc.

The above-mentioned items ⑤ and ⑥ are performed periodically or at any time as needed. In addition, the document management and maintenance service company provides the controller software user (owner) company with management documents ⑦. Moreover, the document management and maintenance service company reports actual document management (use) results ⑧ to the controller software user (owner) company at fixed intervals. According to the report on the results ⑧, the controller software user (owner) company pays for document management expenses to the document management and maintenance service company, and pays for software maintenance expenses to the controller software maintenance company ⑨.

Figure 15:
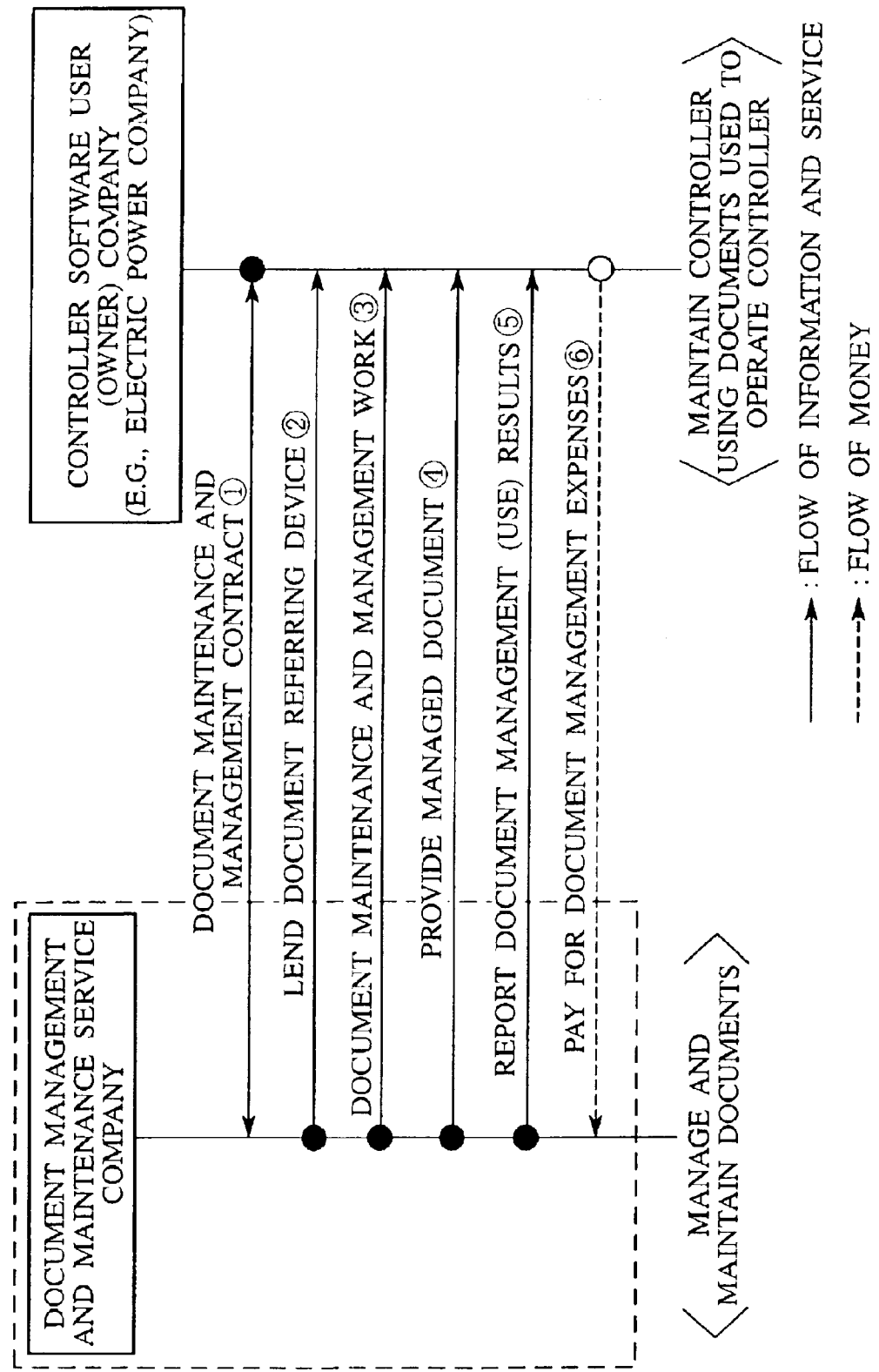
FIG. 15 is a diagram illustrating another example in which the document storing and managing system shown in FIG. 1 is applied to business.

FIG. 15 is a diagram illustrating another example in which the document storing and managing system shown in FIG. 1 is applied to business. In an example which will be described here, the controller software user (owner) company has the control system 2, and operates and controls, for example, processes of an electric power producing facility using documents. In addition, the controller software user (owner) company also executes maintenance work of software which is a control document used in house.

In this example, to begin with, the controller software user (owner) company and the document management and maintenance service company make a document maintenance and management contract ① with each other to the effect that the document management and maintenance service company manages and maintains documents which are software possessed by the controller software user (owner) company.

After the above-mentioned contract is made, the document management and maintenance service company lends a document referring device ② to the controller software user (owner) company, and uses the document server 1, which is operated in house, to execute maintenance and management work ③ of documents which the controller software user (owner) company uses in the control system 2 for controlling a process, etc. This work ③ is performed periodically or at any time as needed. Additionally, the document management and maintenance service company provides the controller software user (owner) company with management documents ④.

The document management and maintenance service company reports actual document management (use) results ⑤ to the controller software user (owner) company at fixed intervals. According to the report on the results ⑤, the controller software user (owner) company pays for document management expenses to the document management and maintenance service company ⑥.

According to the example in which the above-mentioned embodiment is applied to business, the controller software user (owner) company which operates processes can entrust management, and maintenance, of software used for the process control to the document management and maintenance service company and the controller software maintenance company. This enables effective use of company-owned assets for the purpose of operating the processes, which leads to efficient operation of the processes.

As described above, documents used for the process control can be managed and maintained from the document server 1 and the terminal system 3, with the result that the documents can be update quickly, and that an operated process can always be kept in the most preferable state of operation.

Next, another embodiment will be described with reference to FIGS. 16 through 23. Here, a configuration of a document storing and managing system, a configuration example of a design document of a plant controller, and the correlation between the design document and the plant controller are similar to those illustrated in FIGS. 1, 2, and 3, respectively. Therefore, the description thereof will be omitted.

Figure 16:
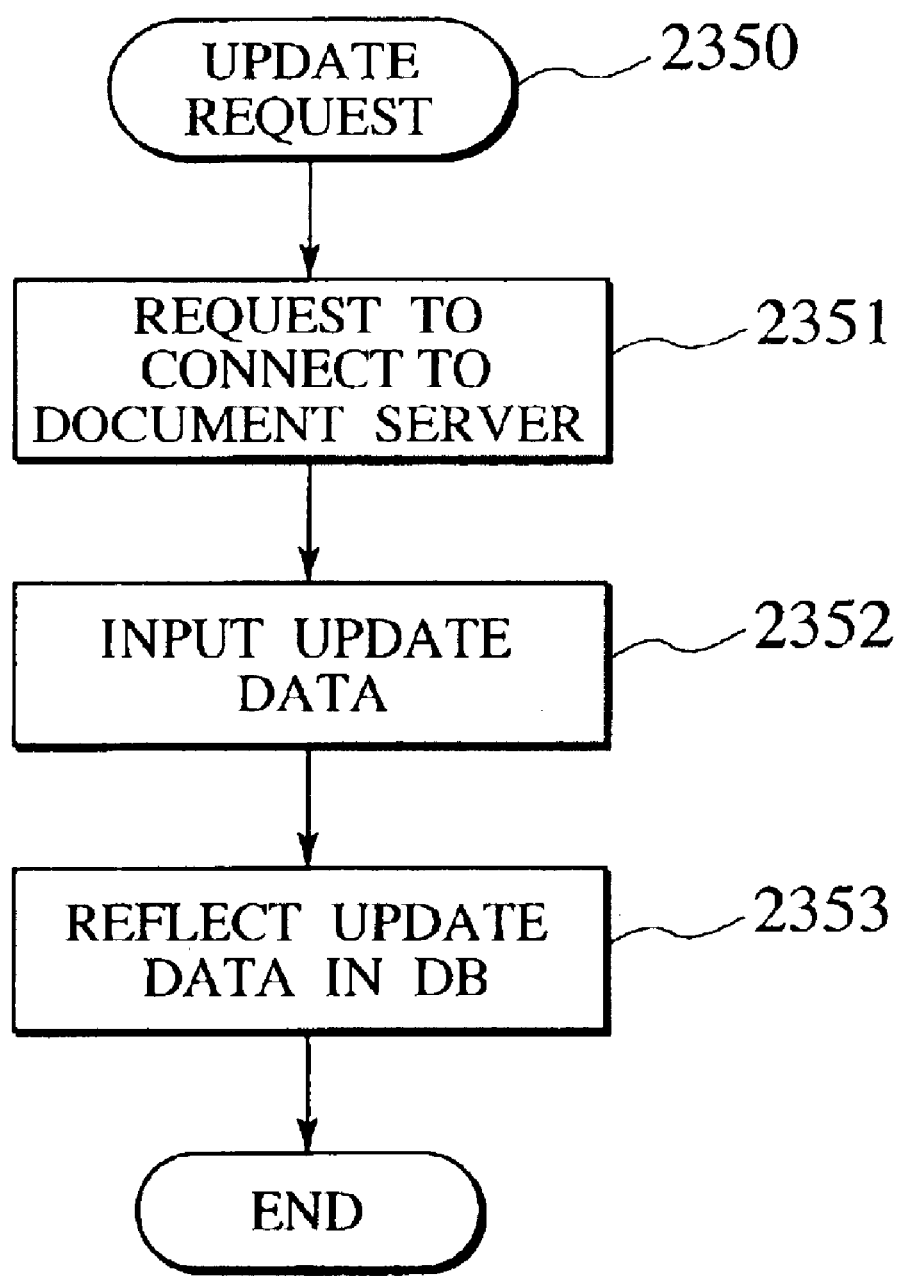
FIG. 16 is a flowchart illustrating processing at a distributed terminal performed when a design document which is stored in a plant document DB of the terminal system is synchronized with a design document in the plant document DB of the document server, according to another embodiment.

FIG. 16 is a flowchart illustrating processing at the distributed terminal in the system shown in FIGS. 1, 2, and 3. The processing is performed when a design document which is stored in the plant document DB 32 of the terminal system 3 is synchronized with a design document in the plant document DB of the document server 1. Next, the processing will be described.

Upon reception of an update request 2350 from a user, the terminal system 3 transmits a connection request 2351 to the document server 1 (steps 2350, 2351). When permitting the connection and receiving the update request, the document server 1 transmits data that permits the input of update data. Consequently, the terminal system 3 downloads the update data from the document server 1, and then reflects the downloaded data in the plant document DB 32 (steps 2352, 2353).

Figure 17:
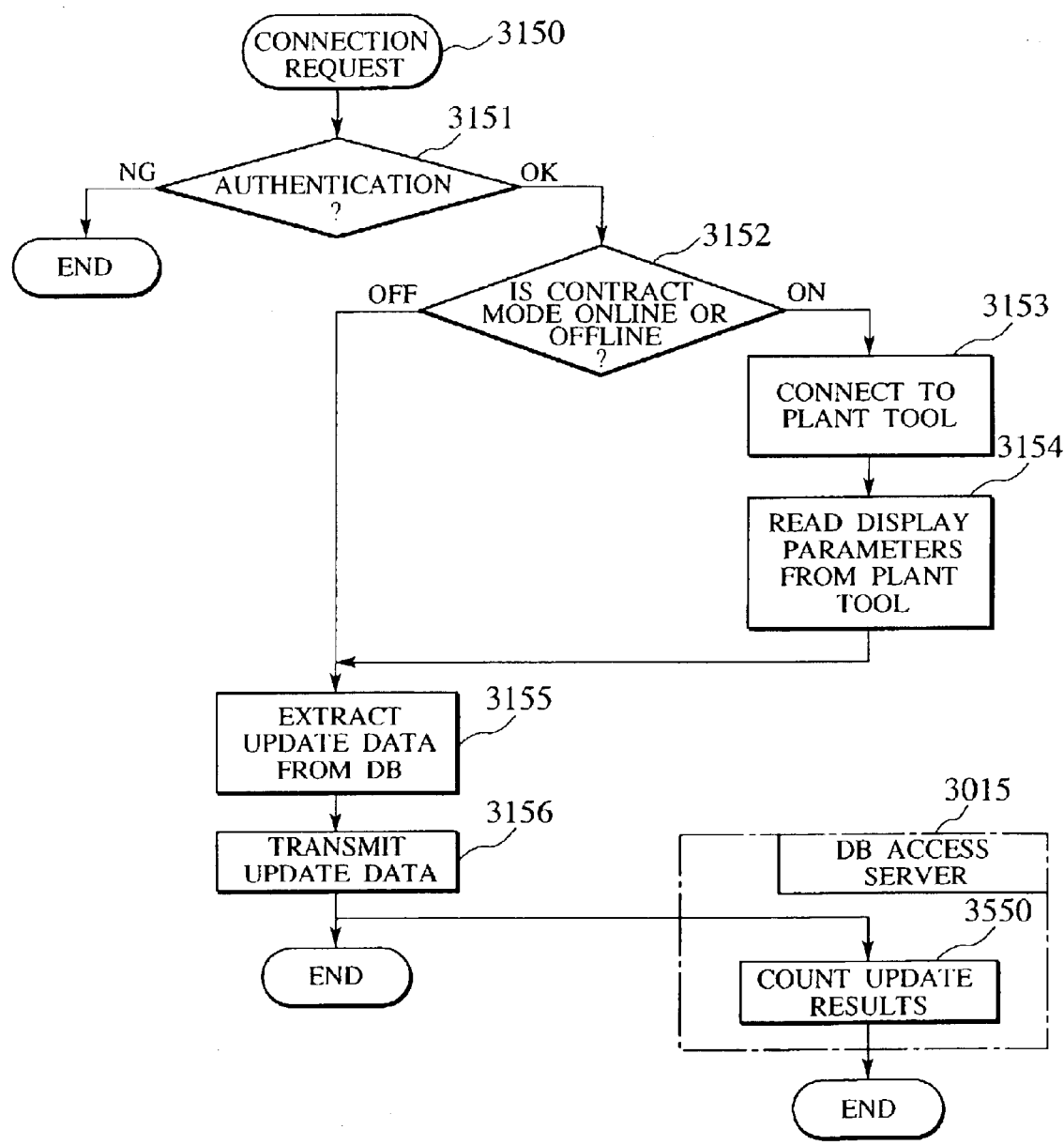
FIG. 17 is a diagram illustrating processing of the document server according to another embodiment, which is performed when the document server receives a connection request from the terminal system.

FIG. 17 is a diagram illustrating processing of the document server 1, which is performed when the document server 1 receives a connection request from the terminal system 3. Next, the processing will be described.

(1) Upon reception of a connection request 3150 from the terminal system 3, the document server 1 authenticates the connection request by checking whether or not the connection request is a request properly issued by an authorized user. If the connection request is an improper request issued by an unauthorized user, the document server 1 ends the processing here because the document server 1 cannot accept the request (steps 3150, 3151).

(2) As a result of the authentication in step 3151, if it is found out that the connection request is a proper request issued by an authorized user, the document server 1 judges a contract mode of the terminal system 3, as a level of the distributed terminal, to be an online mode or an offline mode. This embodiment is based on the assumption that the document server 1 inputs operation attributes of elements, which operate in an actual controller, to update the operation attributes at intervals of a certain fixed period of time or when an event occurs. Therefore, at a certain point of time before they are synchronized, there is a possibility that descriptive contents of a document in the plant document DB in the document server 1 may differ temporarily from those of the actual controller operating in the plant. Accordingly, it is assumed that the terminal system 3 is provided with a level (authority) for access to the maintenance tool 21 (step 3152). In other words, the terminal system 3 is allowed to access the maintenance tool 21 in an offline mode which permits the terminal system 3 to obtain data in the document server 1 only, or in an online mode used for strict synchronization with the really operating document in the controller of the plant. The level is prescribed for each terminal according to a contract (step 3152).

(3) As a result of the judgment in step 3152, if a contract mode of the terminal system 3 which has issued the connection request is an online mode, the document server 1 establishes a connection to the maintenance tool 21 as a plant tool in the control system 2, and then reads element parameters of a control document in the maintenance tool 21 (steps 3153, 3154).

(4) The document server 1 updates the plant document DBs 12 through 14 in the own server with the read element parameters of the control document in the maintenance tool 21 so that the plant document DBs 12 through 14 are synchronized. The document server 1 compares the document in the terminal system 3 with the document in its own document DBs 12 through 14 to extract data to be updated, and then transmits the extracted data to the terminal system 3 (steps 3155, 3156).

(5) On the other hand, as a result of the judgment in step 3152, if the contract mode of the terminal system 3 which has issued the connection request is an offline mode, the document server 1 compares the document in the terminal system 3 with the document in its own document DB 12 through 14 at this point to extract data to be updated without performing processing of steps 3153, 3154. Then, the document server 1 transmits the extracted data to the terminal system 3 (steps 3155, 3156).

(6) After that, in response to contents of the transmitted data, the DB access server 15 in the document server 1 counts the number of updated sheets before ending the processing (step 3550).

Figures 18, 19, 20:
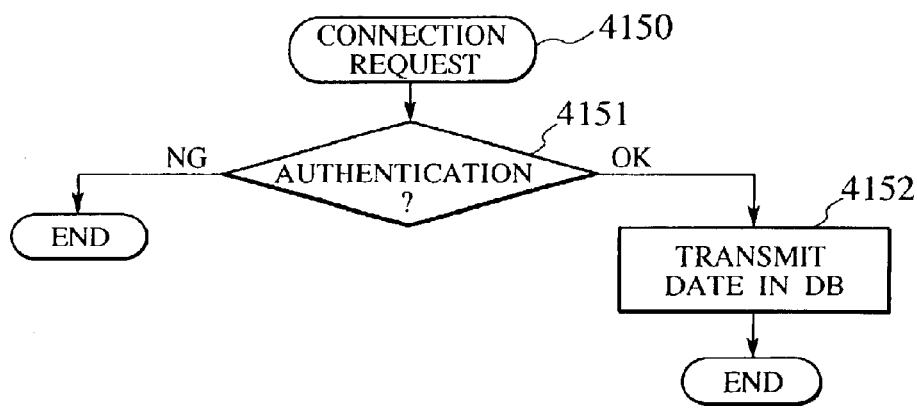
FIG. 18 is a flowchart illustrating how to control processing when the document server 1 issues a connection request of an online mode to a maintenance tool in a control system, according to another embodiment.
FIG. 19 is a diagram illustrating a configuration of a drawing update information table which is given to each plant document included in a system, according to another embodiment.
FIG. 20 is a diagram illustrating a configuration of a separate volume update information table in a drawing, which is given to each plant document included in the system, according to another embodiment.

FIG. 18 is a flowchart illustrating how to control processing when the document server 1 issues a connection request in the online mode to the maintenance tool 21 in the control system 2. Next, the control will be described.

Upon reception of the connection request from the document server 1, the maintenance tool 21 authenticates the connection request. If the connection request is an improper request issued by an unauthorized user, the maintenance tool 21 refuses the connection before ending the processing here (steps 4150, 4151). If there is no problem, the maintenance tool 21 transmits element parameter data in the document DB 32 of the control system 2 to the document server 1 before ending the processing (step 4152).

FIG. 19 is a diagram illustrating a configuration of a drawing update information table which is given to each plant document included in a system.

As shown in FIG. 19, in order to manage each drawing in the document DB, each drawing stores the following information: a drawing name 3250; update date and time 3251 which indicates date and time of the last update, or change, of data in the drawing; the number of separate volumes 3252 included in the drawing; and a separate volume name 3253 of a separate volume included in the drawing.

FIG. 20 is a diagram illustrating a configuration of a separate volume update information table in a drawing which is given to each plant document included in a system.

In order to manage separate volumes constituting a drawing, the separate volume update information table shown in FIG. 20 stores the following information: a separate volume name 3253; update date and time 3251 which indicates date and time of the last update, or change, of data in the separate volume; and the number of sheets 3254 included in the separate volume.

FIG. 21 is a diagram illustrating a configuration of a sheet update information table in a separate volume of a drawing, which is given to each plant document included in a system.

The table shown in FIG. 21 stores the following information: a sheet name 3255; update date and time 3251 which indicates date and time of the last update, or change, of the sheet; actual device synchronized date and time 3256 which indicates date and time when controller CPUs 24, 25 of an actual controller are synchronized with information in the sheet; and a storing controller name 3257 which indicates a controller CPU where the sheet is actually operated and executed.

FIG. 22 is a diagram illustrating a configuration of an element information table in a sheet in a separate volume of a drawing, which is given to each plant document included in a system.

The table shown in FIG. 22 stores a sheet name 3255, an element number 3258, update date and time 3251, actual device synchronized date and time 3256, and a storing controller name 3257.

Figure 23:
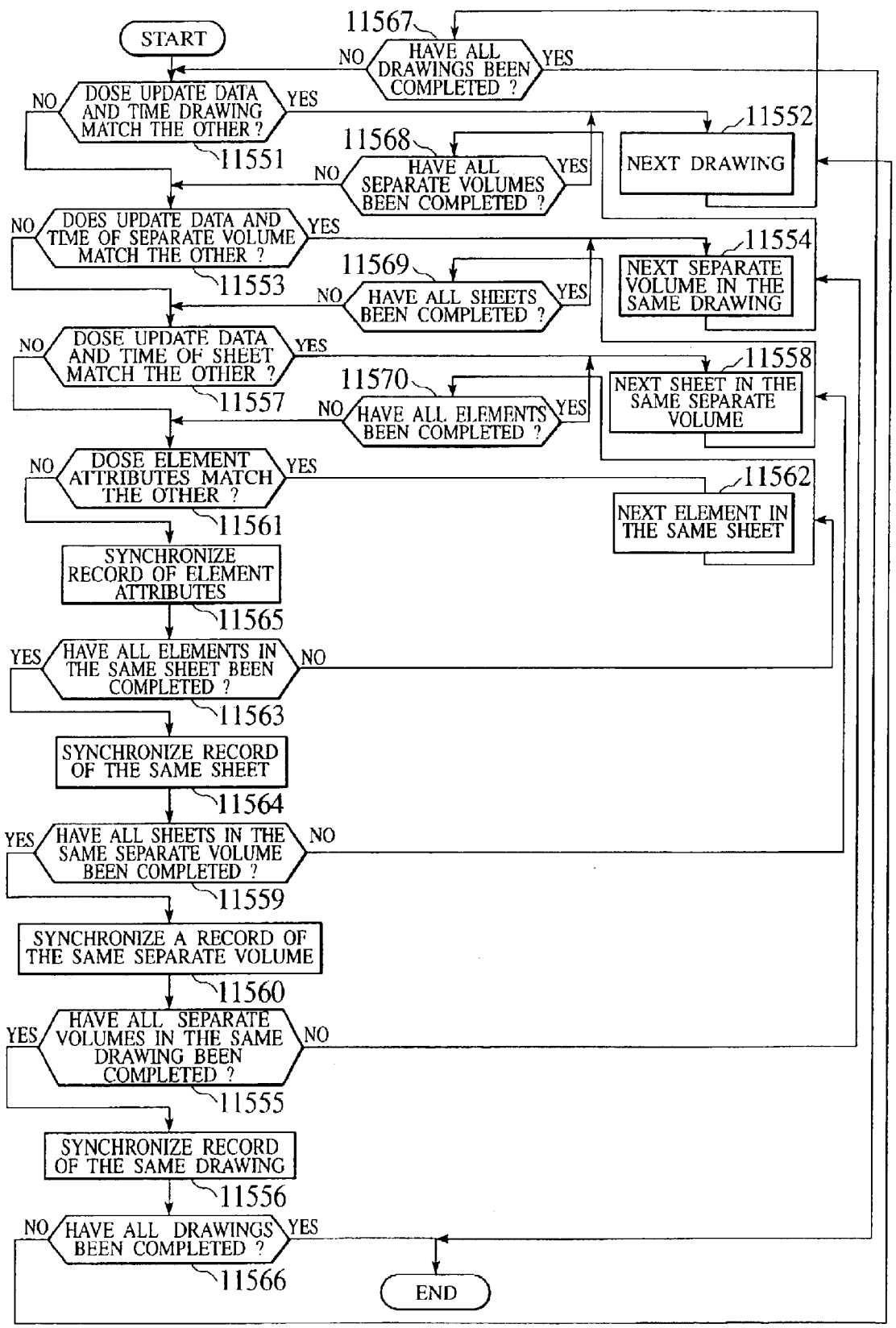
FIG. 23 is a flowchart illustrating processing performed when the document server compares a document in the plant document DBs of the document server with that in a document DB of the terminal system to extract data to be updated, according to another embodiment.

FIG. 23 is a flowchart illustrating processing performed when the document server 1 compares a document in the plant document DBs 12 through 14 of the document server 1 with that in the document DB 32 of the terminal system 3 to extract data to be updated. Next, the processing will be described. The processing is illustrated as the details of the processing described in step 3155 in FIG. 17.

(1) When the processing is started, the document server 1 refers to a drawing update information table of a drawing in the document DB of the own server and a drawing update information table of a corresponding identically named drawing in the document DB of the terminal system 3 to compare the update date and time in both of the drawing update information tables. If both the update date and time are matched with each other, processing for the next drawing in the document DB 32 of the terminal system 3 is performed (steps 11551, 11552).

(2) A judgment is made as to whether or not the processing for all drawings has been completed. If it is judged that the processing for all drawings has not been completed, the process returns to the processing of step 11551 where the comparison of the update date and time is repeated for the next drawing. If it is judged that the processing for all drawings has been completed, the processing here ends (steps 11567).

(3) As a result of the comparison processing in step 11551, if both of the update date and time of the drawing differ from each other, the document server 1 refers to a separate volume update information table of a separate volume of the drawing in the document DB of the document server 1, and a separate volume update information table of a corresponding identically named separate volume of the corresponding identically named drawing in the document DB of the terminal system 3 to compare the update date and time in both of the separate volume update information tables. If both of the update date and time are matched with each other, processing for the next separate volume in the same drawing is performed (steps 11553, 11554).

(4) A judgment is made as to whether or not the processing for all separate volumes has been completed. If it is judged that the processing for all separate volumes has not been completed, the process returns to the processing of step 11553 where the comparison of the update date and time is repeated for the next separate volume. If is judged that the processing for all separate volumes has been completed, the process returns to the processing of step 11552 where the processing is repeated from the next drawing (steps 11568).

(5) As a result of the comparison processing in step 11553, if both of the update date and time of the separate volume differ from each other, the document server 1 refers to a sheet update information table of a sheet in the separate volume of the drawing in the document DB of the document server 1, and a sheet update information table of a corresponding identically named sheet in the corresponding identically named separate volume of the corresponding identically named drawing in the document DB of the terminal system 3 to compare the update date and time in both of the sheet update information tables. If both of the update date and time are matched with each other, processing for the next sheet in the same separate volume is performed (steps 11557, 11558).

(6) A judgment is made as to whether or not the processing for all sheets has been completed. If it is judged that the processing for all sheets has not been completed, the process returns to the processing of step 11557 where the comparison of the update date and time is repeated for the next sheet. If is judged that the processing for all sheets has been completed, the process returns to the processing of step 11554 where the processing is repeated from the next separate volume (steps 11569).

(7) As a result of the comparison processing in step 11557, if both of the update date and time of the sheet differ from each other, the document server 1 refers to an element information table in the sheet, and an element information table in the corresponding sheet to compare the update date and time of attributes of an element in the sheet with that of a corresponding element in the corresponding sheet. If both of the update date and time are coincident with each other, processing for the next element in the same sheet is performed (steps 11561, 11562).

(8) A judgment is made as to whether or not the processing for all elements in the sheet has been completed. If it is judged that the processing for all elements has not been completed, the process returns to the processing of step 11561 where the comparison of the update date and time is repeated for the next element in the same sheet. If is judged that the processing for all elements has been completed, the process returns to the processing of step 11558 where the processing is repeated from the next sheet (step 11570).

(9) As a result of the comparison processing in step 11561, if both of the update date and time of the element differ from each other, attributes of the appropriate element in the document DB 32 of the terminal system 3 are synchronized with those in the document DBs 12 through 14 of the document server 1. Then, the DB access server 15 counts the number of times element attributes are synchronized before storing the count (steps 11565).

(10) A judgment is made as to whether or not the comparison processing of the update date and time of the element, and the synchronization processing, have been completed for all elements in the same sheet. If they have not been completed yet, the process returns to the processing from step 11570 to continue the processing for the elements (steps 11563).

(11) As a result of the judgment in step 11563, if the processing for all elements has been completed, the update date and time of the sheet in the sheet update information table in the document DB 32 of the terminal system 3 is synchronized with that in the document DBs 12 through 14 of the document server 1. Then, the DB access server 15 counts the number of times sheet attributes are synchronized before the count is stored (steps 11564).

(12) A judgment is made as to whether or not the comparison processing of the update date and time of the sheet, and the synchronization processing, have been completed for all sheets in the same separate volume. If they have not been completed yet, the process returns to the processing from step 11569 to continue the processing for the sheets (steps 11559).

(13) As a result of the judgment in step 11559, if the processing for all sheets has been completed, the update date and time of the separate volume in the separate volume update information table in the document DB 32 of the terminal system 3 is synchronized with that in the document DBs 12 through 14 of the document server 1. Then, the DB access server 15 counts the number of times separate volume attributes are synchronized before the count is stored (steps 11560).

(14) A judgment is made as to whether or not the comparison processing of the update date and time of the separate volume, and the synchronization processing, have been completed for all separate volumes in the same drawing. If they have not been completed yet, the process returns to the processing from step 11568 to continue the processing for the separate volumes (steps 11555).

(15) As a result of the judgment in step 11555, if the processing for all separate volumes has been completed, the update date and time of the same drawing in the drawing update information table in the document DB 32 of the terminal system 3 is synchronized with that in the document DBs 12 through 14 of the document server 1. Then, the DB access server 15 counts the number of times drawing attributes are synchronized before the count is stored (steps 11556).

(16) A judgment is made as to whether or not the processing to this point has been completed for all drawings. If the processing for all drawings has been completed, the processing here ends. If the processing for all drawings has not been completed yet, the process returns to the processing from step 11567 to repeat the processing until the processing for all documents in the document DB 32 of the terminal system 3 is completed (step 11566).

Figure 24:
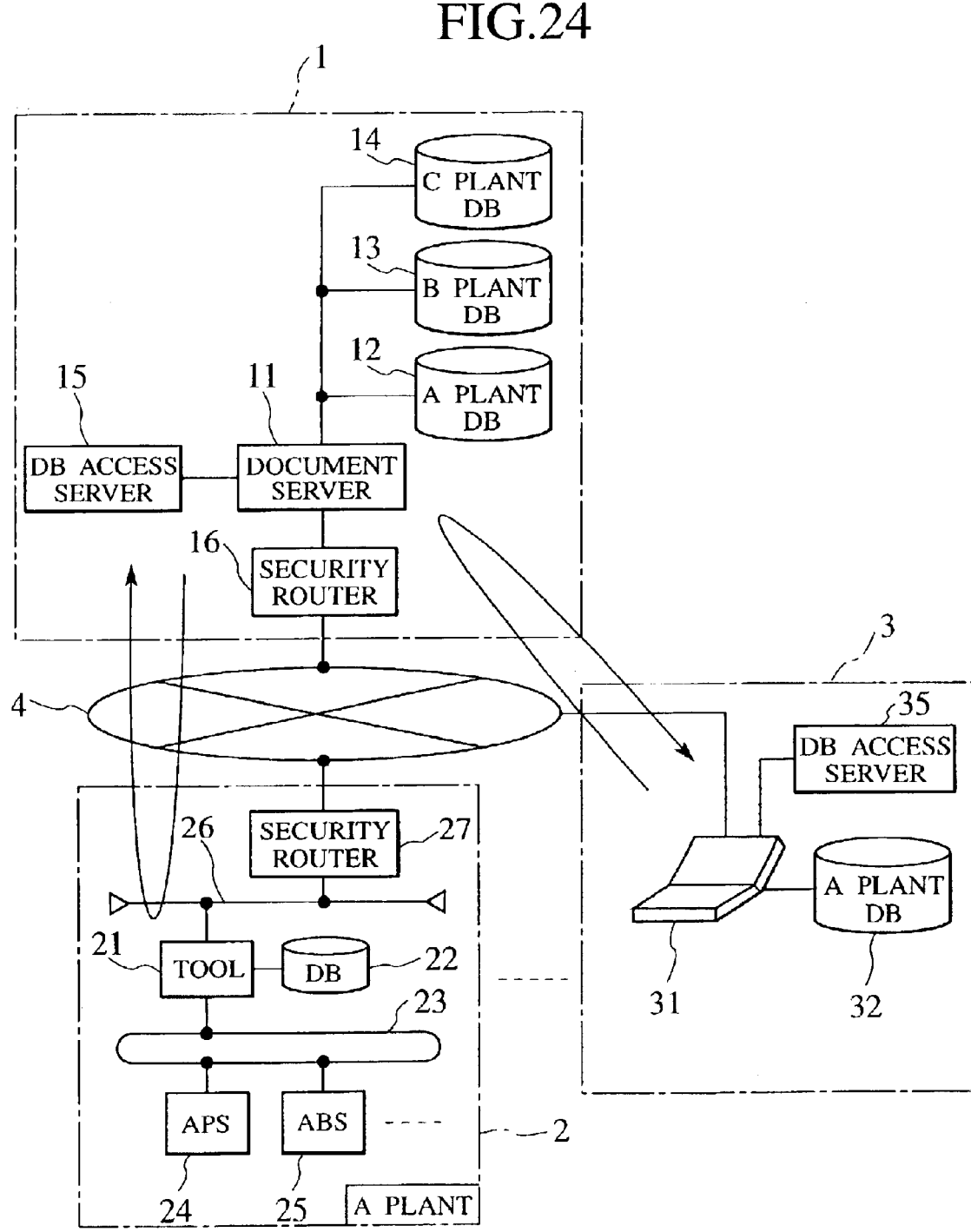
FIG. 24 is a block diagram illustrating a configuration of a document storing and managing system according to another embodiment of the present invention.

FIG. 24 is a block diagram illustrating a configuration of a document storing and managing system according to another embodiment of the present invention. In FIG. 24, reference numeral 35 is a DB access server. The other reference numerals denote the same parts as those shown in FIG. 1.

As described with reference to FIG. 1, the document server 1 is provided with the DB access server 15, whereas in the configuration shown in FIG. 24, the terminal system 3 is provided with the DB access server 35 having functions similar to those of the DB access server 15. Such a configuration permits the terminal system 3 to keep track of the amount of documents used.

Figure 25:
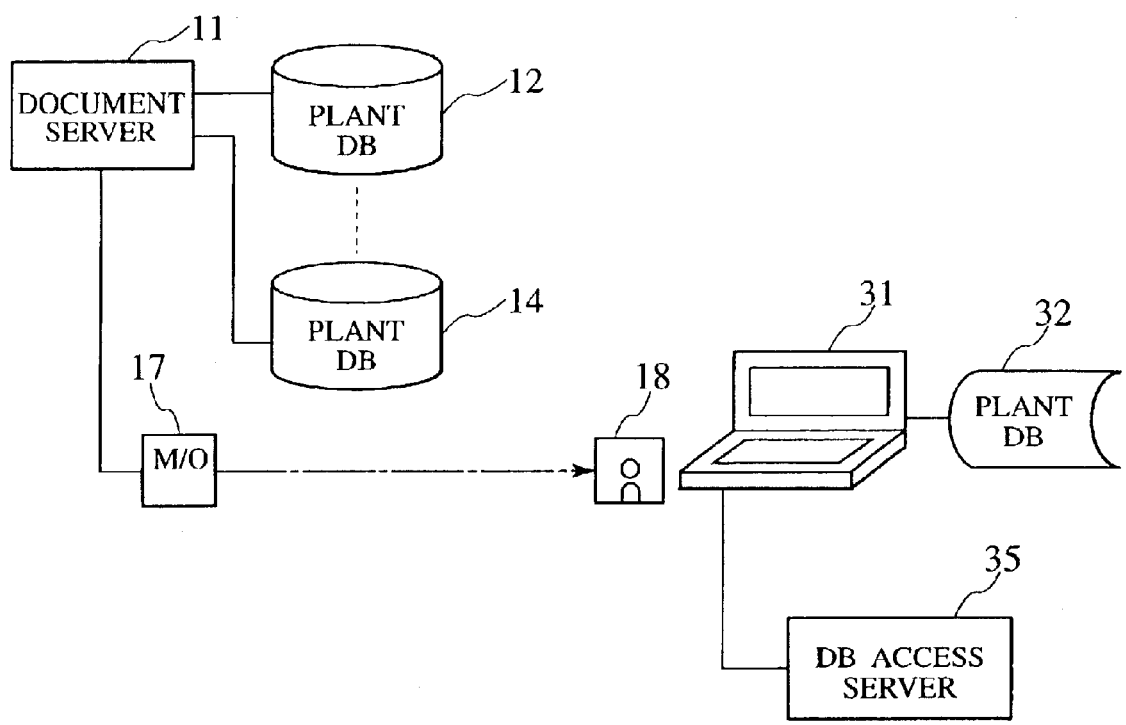
FIG. 25 is a block diagram illustrating a configuration of a document storing and managing system according to another embodiment of the present invention.

FIG. 25 is a block diagram illustrating a configuration of a document storing and managing system according to another embodiment of the present invention. In FIG. 25, reference numeral 17 is a recording medium. The other reference numerals denote the same parts as those shown in FIG. 24. It is to be noted that although the control system 2 is not illustrated in FIG. 25, as is the case with FIGS. 1 and 24, the control system 2 is also included in an example shown in FIG. 25.

In the examples described above, the terminal system 3 is connected to the document server 1 through a communication line. However, in the example shown in FIG. 25, data is sent and received between both using a rewritable recording medium 17 such as MO, FD, CD, and DVD without connecting the terminal system 3 to the document server 1 through a communication line.

According to the embodiment shown in FIG. 25, on the terminal system 3 side, it is possible to compare contents of the recording medium 17 created from the document DB 12 of the document server 1 with a drawing update information table, a separate volume update information table, a sheet update information table, and a sheet element information table in the document DB 32 of the terminal system 3 to synchronize required data. This enables synchronization of documents in the document DB 12 of the document server 1 with documents in the document DB 32 of the terminal system 3. In addition, in this example, providing the terminal system 3 with the DB access server 35 also permits the terminal system 3 to check the amount of updated information.

Moreover, the control system 2 which is not illustrated in FIG. 25 may be connected to the document server 1 through a communication line; or as is the case with the above-mentioned example, the exchange of data between both may also be performed using a recording medium.

According to each of the embodiments described above, documents used for the process control in the control system 2 can be managed and maintained from the document server 1 and the terminal system 3 while keeping the document data in the document server 1 and that in the terminal system 3 synchronized. Additionally, the documents can be updated quickly, and an operated process can always be kept in the most preferable state of operation.

Next, an example showing how a document storing and managing system for storing and managing documents used for plant control, and a document maintaining and managing method for maintaining and managing documents used for plant control, according to the above-mentioned embodiment are applied to business will be described.

FIG. 26 is a diagram illustrating an example in which the document storing and managing system shown in FIG. 1 is applied to business. In FIG. 14, a controller software user (owner) company has the control system 2, and operates and controls, for example, processes of an electric power producing facility using documents. A document management and maintenance service company has the document server 1, and provides management and maintenance services of documents according to a contract with the controller software user (owner) company. In addition, a controller software maintenance company has the terminal system 3, and performs maintenance work of software which is a control document used by the controller software user (owner) company.

In the above description, the controller software user (owner) company and the controller software maintenance company make a software maintenance contract ① with each other to the effect that the controller software maintenance company maintains software possessed by the controller software user (owner) company. Further, the controller software user (owner) company and the document management and maintenance service company make a document maintenance and management contract ② with each other to the effect that the document management and maintenance service company manages and maintains documents which are software possessed by the controller software user (owner) company.

After the above-mentioned contract is made, the document management and maintenance service company uses the document server 1, which is operated in house, to execute maintenance and management work ③ of documents which the controller software user (owner) company uses in the control system 2 for controlling a process, etc. In addition, the controller software maintenance company uses the terminal system 3 to execute maintenance work ④ of software which the controller software user (owner) company uses in the control system 2 for controlling a process, etc.

The above-mentioned items ③ and ④ are performed periodically or at any time as needed. In addition, the document management and maintenance service company provides the controller software maintenance company with management documents ⑤. Moreover, the document management and maintenance service company also provides the controller software user (owner) company with the management documents ④ as needed.

Further, the document management and maintenance service company reports actual document management (use) results ⑦ to the controller software user (owner) company at fixed intervals. According to the report on the results ⑦, the controller software user (owner) company pays for software maintenance expenses to the controller software maintenance company, and also pays for document management expenses to the document management and maintenance service company.

FIG. 27 is a diagram illustrating another example in which the document storing and managing system shown in FIG. 1 is applied to business. In an example which will be described here, the controller software user (owner) company has the control system 2, and operates and controls, for example, processes of an electric power producing facility using documents. In addition, the controller software user (owner) company has the terminal system 3, and also executes maintenance work of software which is a control document used in house.

In this example, to begin with, the controller software user (owner) company and the document management and maintenance service company make a document maintenance and management contract ① with each other to the effect that the document management and maintenance service company manages and maintains documents which are software possessed by the controller software user (owner) company.

After the above-mentioned contract is made, the document management and maintenance service company uses the document server 1, which is operated in house, to execute maintenance and management work ② of documents which the controller software user (owner) company uses in the control system 2 for controlling a process, etc. This work ② is performed periodically or at any time as needed. Additionally, the document management and maintenance service company provides the controller software user (owner) company with management documents ③.

The document management and maintenance service company reports actual document management (use) results ④ to the controller software user (owner) company at fixed intervals. According to the report on the results ④, the controller software user (owner) company pays for software maintenance expenses to the controller software maintenance company, and also pays for document management expenses to the document management and maintenance service company ⑤.

According to the example in which the above-mentioned embodiment is applied to business, the controller software user (owner) company which operates processes can entrust management, and maintenance, of software used for the process control to the document management and maintenance service company and the controller software maintenance company. This enables effective use of company-owned assets for the purpose of operating the processes.

As described above, documents used for the process control can be managed and maintained from the document server 1 and the terminal system 3, with the result that the documents can be update quickly, and that an operated process can always be kept in the most preferable state of operation.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A document management system comprising:
    a document storing and managing device for storing and managing documents which describe control software of a controller; and
    a software maintenance tool of the controller installed in a control system, said software maintenance tool being connected to the document storing and managing device through a communication line;
    wherein, when the software maintenance tool of the controller performs operation such as a change, a modification, an addition, and a deletion of the control software of the controllers the result of the operation is reflected in documents of control circuit software, which are stored and managed by the document storing and managing device, on a document sheet basis, and the documents stored in the document storing and managing device of the control software of the controller and software of the controller included in the control system are managed in synchronization with each other, thereby allowing the documents of the control circuit software, which are stored and managed by the document storing and managing device, to be referred to on the document sheet basis from the software maintenance tool.

2. A document management system according to claim 1, further comprising a terminal system which is connected to the communication line,
    wherein said terminal system can maintain and refer to software in each sheet of a document which describes the control software of the controller, said document being stored in the document storing and managing device.

3. A document management system according to claim 2, wherein when the terminal system which is connected to the communication line refers to a document of control circuit software of the controllers the terminal system fetches an operating state of a signal obtained in the controller to superimpose this state on a displayed document of the control circuit software.

4. A document management system according to claim 3, wherein said number of times the document is referred to is a value which is counted every time a sheet is referred to for a new display and a form feed, and also a value which is counted every time a period of time during which a signal operating state of the controller is superimposed is referred to.

5. A document management system according to claim 3, wherein said number of times the document is referred to is a value which is counted every time a sheet is referred to for a new display and a form feed, and also a value which is counted every time control operation attributes accompanying an element in a sheet are read from the controller to display the control operation attributes.

6. A document management system according to claim 2, wherein said document is constituted of a plurality of document sheets which can be referred to and edited, said plurality of sheets constituting a drawing;
    said drawing can be divided into separate volumes, each of which is constituted of one or more sheets;
    said document is created in a unit of the storage of a computer and a control device for the controller where a control circuit is stored, or on a control operation attribute basis and on an element display attribute basis, said attributes being given to each drawing as a set of separate volumes, separate volumes and document sheets, and being given to each element in the document sheet; and
    said terminal system can lend or return the document from or to the document storing and managing device in the unit of the storage.

7. A document management system according to claim 2, wherein said document storing and managing device has a function of monitoring and storing the number or times a document is referred to every time the maintenance tool of the controller, or the terminal system which maintains and refers to software, lends a document from the document storing and managing device to perform operation of the document such as a change, a modification, an addition, and a deletion; and
    for each terminal system, or for each maintenance tool, which has referred to the document, the number of times the document is lent in stored, and every time the document is returned after the operation of the document such as a change, a modification, an eddition, and a deletion, the number of times the document is returned is monitored and stored.

8. A document management system according to claim 7, wherein said number of time the document is lent is a value which in separately counted as a count value of lending on a sheet basis, that on a separate volume basis, that on a drawing basis, which are units of lending, as an edit count of a changed element if only an attribute of the element is changed, and as a count value of lending in a unit of the storage of the controller, and said number of times the document is returned is a value which is separately counted as a count value of return on a sheet basis, that on a separate volume basis, that on a drawing basis, which are units of return, as an edit count of a changed element if only an attribute of the element is changed, and an a count value of return in a unit of the storage of the controller.

9. A document management system according to claim 8, wherein said terminal system changes and edits control operation attributes accompanying an element in a sheet, and every time the control operation attributes are written into a document and the controller, the number of times is counted.

10. A document management system according to claim 1, wherein said document storing and managing device has a function of monitoring and storing the number of times a document is referred to for each terminal system, or for each maintenance tool, which has referred to the document which describes control software possessed by the own device; and the number of times the document is referred to and used is kept track of for each terminal system or for each maintenance tool, which has referred to the document.

11. A document management system according to claim 10, wherein said number of times the document is referred to is a value which is counted every time a sheet is referred to for a new display and a form feed.

12. A document management system according to claim 10, wherein said number of times the document is referred to is a value which is counted every time a sheet is referred to for a new display and a form feed, and also a value which is counted every time control operation attributes accompanying an element in a sheet are referred to.

13. A document management method, comprising the steps of:

when a software maintenance tool of a controller performs operation such as a change, a modification, an addition, and a deletion of the control software of the controller, reflecting the result of the operation in documents of control circuit software, which are stored and managed by a document storing and managing device, on a document sheet basis, and managing the documents stored in the document storing and managing device of the control software of the controller and software of a description device included in a control system in association with each other, thereby allowing the documents of the control circuit software, which are stored and manage by the document storing and managing device, to be referred to on a document sheet from the software maintenance tool.

* * * * *